United States Patent
Ohki et al.

(10) Patent No.: US 11,509,951 B2
(45) Date of Patent: Nov. 22, 2022

(54) CONTROL DEVICE, CONTROL METHOD, AND ELECTRONIC DEVICE

(71) Applicant: SONY CORPORATION, Tokyo (JP)

(72) Inventors: Yoshihito Ohki, Tokyo (JP); Hirotaka Tako, Kanagawa (JP); Masao Kondo, Kanagawa (JP); Yusuke Tsujita, Kanagawa (JP); Yohei Nakajima, Kanagawa (JP); Daisuke Shiono, Tokyo (JP); Miho Yamada, Saitama (JP); Masanori Matsushima, Tokyo (JP); Hiroshi Nakayama, Tokyo (JP); Seiji Suzuki, Kanagawa (JP); Kenichi Yamaura, Nagano (JP); Yoshiyasu Kubota, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/764,987

(22) PCT Filed: Nov. 13, 2018

(86) PCT No.: PCT/JP2018/041901
§ 371 (c)(1),
(2) Date: May 18, 2020

(87) PCT Pub. No.: WO2019/102897
PCT Pub. Date: May 31, 2019

(65) Prior Publication Data
US 2020/0413119 A1 Dec. 31, 2020

(30) Foreign Application Priority Data

Nov. 27, 2017 (JP) .............................. JP2017-226838

(51) Int. Cl.
*H04N 21/41* (2011.01)
*G06F 3/01* (2006.01)
*G06F 3/0346* (2013.01)
*H04N 21/422* (2011.01)

(52) U.S. Cl.
CPC ....... *H04N 21/41265* (2020.08); *G06F 3/016* (2013.01); *G06F 3/0346* (2013.01); *H04N 21/42225* (2013.01)

(58) Field of Classification Search
CPC ........ H04N 21/41265; H04N 21/42225; G06F 3/016; G06F 3/0346
(Continued)

(56) References Cited

U.S. PATENT DOCUMENTS

2009/0066647 A1 3/2009 Kerr et al.
2009/0066648 A1 3/2009 Kerr et al.
(Continued)

FOREIGN PATENT DOCUMENTS

CN 101796476 A 8/2010
CN 104102376 A 10/2014
(Continued)

OTHER PUBLICATIONS

International Search Report and Written Opinion of PCT Application No. PCT/JP2018/041901, dated Feb. 5, 2019, 10 pages of ISRWO.

*Primary Examiner* — John W Miller
*Assistant Examiner* — Omer Khalid
(74) *Attorney, Agent, or Firm* — Chip Law Group

(57) ABSTRACT

The present disclosure relates to a control device, a control method, an electronic device, and a program that enables an operation in a natural manner for switching between and remotely operating various control target devices. A plurality of control target devices emits infrared light codes each including a unique ID in a predetermined pattern. A user holds a controller and directs an infrared light receiving unit toward a control target device. At this time, a control state is established for the control target device specified by an infrared light code received by the controller. After the
(Continued)

control state has been established, when a user rotates a main body of the controller, a control parameter in accordance with the amount of rotation is calculated, and a control command in accordance with the control parameter is transmitted to the control target device to control the control target device. The present disclosure can be applied to a remote controller.

17 Claims, 24 Drawing Sheets

(58) Field of Classification Search
USPC .......................................................... 348/734
See application file for complete search history.

(56) References Cited

U.S. PATENT DOCUMENTS

| | | |
|---|---|---|
| 2009/0322676 A1 | 12/2009 | Kerr et al. |
| 2010/0141578 A1* | 6/2010 | Horiuchi .......... H04N 21/42204 345/158 |
| 2012/0299709 A1 | 11/2012 | Nishimura |
| 2014/0292668 A1 | 10/2014 | Fricklas et al. |
| 2017/0255263 A1* | 9/2017 | Letendre .............. H04N 5/4403 |

FOREIGN PATENT DOCUMENTS

| | | |
|---|---|---|
| CN | 104793868 A | 7/2015 |
| DE | 10-2014-100872 A1 | 10/2014 |
| EP | 2171567 A1 | 4/2013 |
| EP | 2584446 A2 | 4/2013 |
| JP | 2007-110350 A | 4/2007 |
| JP | 200711035 A * | 4/2007 |
| JP | 2008-42748 A | 2/2008 |
| JP | 2010-538400 A | 12/2010 |
| JP | 2012-249104 A | 12/2012 |
| JP | 2013-222399 A | 10/2013 |
| JP | 2014-203457 A | 10/2014 |
| JP | 2015-38750 A | 2/2015 |
| KR | 10-2010-0050577 A | 5/2010 |
| KR | 10-2012-0086381 A | 8/2012 |
| WO | 2009/032998 A1 | 3/2009 |

* cited by examiner

FIG. 14

| | DISCRETE VARIABLE PARAMETER | CONTINUOUS VARIABLE PARAMETER |
|---|---|---|
| SPEAKER DEVICE | | VOLUME |
| TELEVISION RECEIVER | CHANNEL | VOLUME |
| LIGHTING DEVICE | | BRIGHTNESS |
| AIR CONDITIONER | | TEMPERATURE/AIR VOLUME |
| BLIND | | LIGHT SHIELDING ANGLE |
| DOOR | LOCK/UNLOCK | |

CONTROL DEVICE, CONTROL METHOD, AND ELECTRONIC DEVICE

CROSS REFERENCE TO RELATED APPLICATIONS

This application is a U.S. National Phase of International Patent Application No. PCT/JP2018/041901 filed on Nov. 13, 2018, which claims priority benefit of Japanese Patent Application No. JP 2017-226838 filed in the Japan Patent Office on Nov. 27, 2017. Each of the above-referenced applications is hereby incorporated herein by reference in its entirety.

TECHNICAL FIELD

The present disclosure relates to a control device, a control method, an electronic device, and a program, and more particularly, to a control device, a control method, an electronic device, and a program that allows for an operation in a natural manner for remotely operating various control target devices.

BACKGROUND ART

A control device capable of remotely operating a control target device has been proposed (see Patent Document 1).

CITATION LIST

Patent Document

Patent Document 1: Japanese Patent Application Laid-Open No. 2013-222399

SUMMARY OF THE INVENTION

Problems to be Solved by the Invention

In the technology of Patent Document 1 described above, a display unit included in a control device is used to display the type of device, parameters that can be controlled, and feedback when the control device is directed toward a device to be controlled, and a corresponding operation is required to be performed after reading what is displayed.

For this reason, in the remote operation using the above-described control device, although a user basically looks fixedly at a device to be operated in many cases, the user needs to use the display unit of the control device itself for feedback. This results in the user's line-of-sight frequently moving back and forth between the control target device in front of the user and the display unit of the control device in hand, and impairs usability.

In order to avoid such a situation, for example, it is conceivable to configure tactile feedback. However, holding down of a button or a simple vibration alone conveys nothing more than information that something has happened.

The present disclosure has been made in view of such a situation, and in particular, has been made to allow for an operation in a natural manner for remotely operating various control target devices.

Solutions to Problems

A control device according to a first aspect of the present disclosure is a control device including an identification signal receiving unit that receives, from a control target device that transmits or receives a directional wireless signal, an identification signal for identifying the control target device, and a control unit that transmits a control command for controlling the control target device specified by the identification signal, to the control target device that has transmitted the identification signal, in which the identification signal receiving unit receives the identification signal for identifying the control target device when a direction of a main body of the control device has been adjusted to a state that allows for reception of the identification signal.

A direction detection unit that detects the direction of the main body of the control device may be further included, and the control unit may generate a control command for controlling the control target device specified by the identification signal on the basis of a change in the direction of the main body of the control device detected by the direction detection unit, and transmit the generated control command to the control target device that has transmitted the identification signal.

The control unit may calculate a control parameter for controlling the control target device specified by the identification signal on the basis of a change in the direction of the main body detected by the direction detection unit, generate a control command in accordance with the control parameter, and transmit the control command to the control target device that has transmitted the identification signal.

The control unit may calculate a control parameter for controlling the control target device specified by the identification signal on the basis of an amount of rotation when a twisting rotation around a predetermined axis is applied to the main body of the control device detected by the direction detection unit, generate a control command in accordance with the control parameter, and transmit the control command to the control target device that has transmitted the identification signal.

A vibration unit that vibrates the main body of the control device may be further included, and the control unit may cause the vibration unit to vibrate in accordance with the control parameter.

The control unit may cause the vibration unit to vibrate at a predetermined time interval and at a predetermined intensity in accordance with the control parameter.

The control unit may cause, in a case where the control parameter is a continuous variable, the vibration unit to vibrate at a time interval in accordance with the control parameter and at an intensity in accordance with the control parameter.

The control unit may cause, in a case where the control parameter is a discrete variable, the vibration unit to vibrate at a time interval in accordance with the control parameter and at a constant intensity.

The control unit may receive feedback information indicating a state of the control target device after the control target device that has transmitted the identification signal has executed the control command, and cause the vibration unit to vibrate on the basis of the feedback information.

An audio output unit that generates sound may be further included, and the control unit may cause the audio output unit to output sound in accordance with the control parameter.

The control target device may be a speaker device, and the control command may be a command for controlling a volume of the speaker device.

The control target device may be a television receiver, and the control command may be a command for controlling a channel of the television receiver.

The control target device may be a lighting device, and the control command may be a command for controlling brightness of the lighting device.

The control target device may be a projector device, and the control command may be a command for controlling movement of content projected on a wall surface by the projector device.

A vibration unit that vibrates the main body of the control device and an imaging unit that images a wall surface on which the content is projected by the projector device may be further included, and the control unit may estimate a texture of the wall surface on the basis of an image captured by the imaging unit, and, when the content projected on the wall surface is moved, the control unit may cause the vibration unit to vibrate in accordance with bumps and dips of the texture in a path through which the content is moved.

The control target device may emit the identification signal by infrared light having a predetermined light emission pattern, an electromagnetic wave output by a directional antenna, or an ultrasonic wave output by a directional speaker.

A control method according to the first aspect of the present disclosure is a method of controlling a control device, the method including identification signal receiving processing of receiving, from a control target device that transmits or receives a directional wireless signal, an identification signal for identifying the control target device, and control processing of transmitting a control command for controlling the control target device specified by the identification signal, to the control target device that has transmitted the identification signal, in which the identification signal receiving processing receives the identification signal for identifying the control target device when a direction of a main body of the control device has been adjusted to a state that allows for reception of the identification signal.

A program according to the first aspect of the present disclosure is a program that causes a computer that controls a control device to function, the program causing the computer to function as an identification signal receiving unit that receives, from a control target device that transmits or receives a directional wireless signal, an identification signal for identifying the control target device, and a control unit that transmits a control command for controlling the control target device specified by the identification signal, to the control target device that has transmitted the identification signal, in which the identification signal receiving unit receives the identification signal for identifying the control target device when a direction of a main body of the control device has been adjusted to a state that allows for reception of the identification signal.

In the first aspect of the present disclosure, from a control target device that transmits or receives a directional wireless signal, an identification signal for identifying the control target device is received, and a control command for controlling the control target device specified by the identification signal is transmitted to the control target device that has transmitted the identification signal. The identification signal for identifying the control target device is received when a direction of a main body of the control device has been adjusted to a state that allows for reception of the identification signal.

An electronic device according to a second aspect of the present disclosure is an electronic device controlled by a control device, the electronic device including an identification signal generation unit that generates an identification signal for identifying itself as the electronic device by a directional wireless signal, and a control unit that controls operation, with the electronic device recognized as a control target device on the basis of the identification signal, by executing a control command for controlling the electronic device transmitted from the control device, in which the identification signal is received by the control device as the identification signal for identifying the electronic device when a direction of a main body of the control device is adjusted to a state that allows for reception of the identification signal.

According to the second aspect of the present disclosure, in an electronic device controlled by a control device, an identification signal for identifying itself as the electronic device by a directional wireless signal is generated, the electronic device is recognized as a control target device on the basis of the identification signal, a control command for controlling the electronic device transmitted from the control device is executed, and thus operation is controlled. The identification signal is received by the control device as the identification signal for identifying the electronic device when a direction of a main body of the control device is adjusted to a state that allows for reception of the identification signal.

Effects of the Invention

An aspect of the present disclosure allows for an operation in a natural manner for remotely operating various control target devices.

BRIEF DESCRIPTION OF DRAWINGS

FIG. 14 is a diagram illustrating other control target devices and parameters that are controlled by the controller.

MODE FOR CARRYING OUT THE INVENTION

Figure 1:
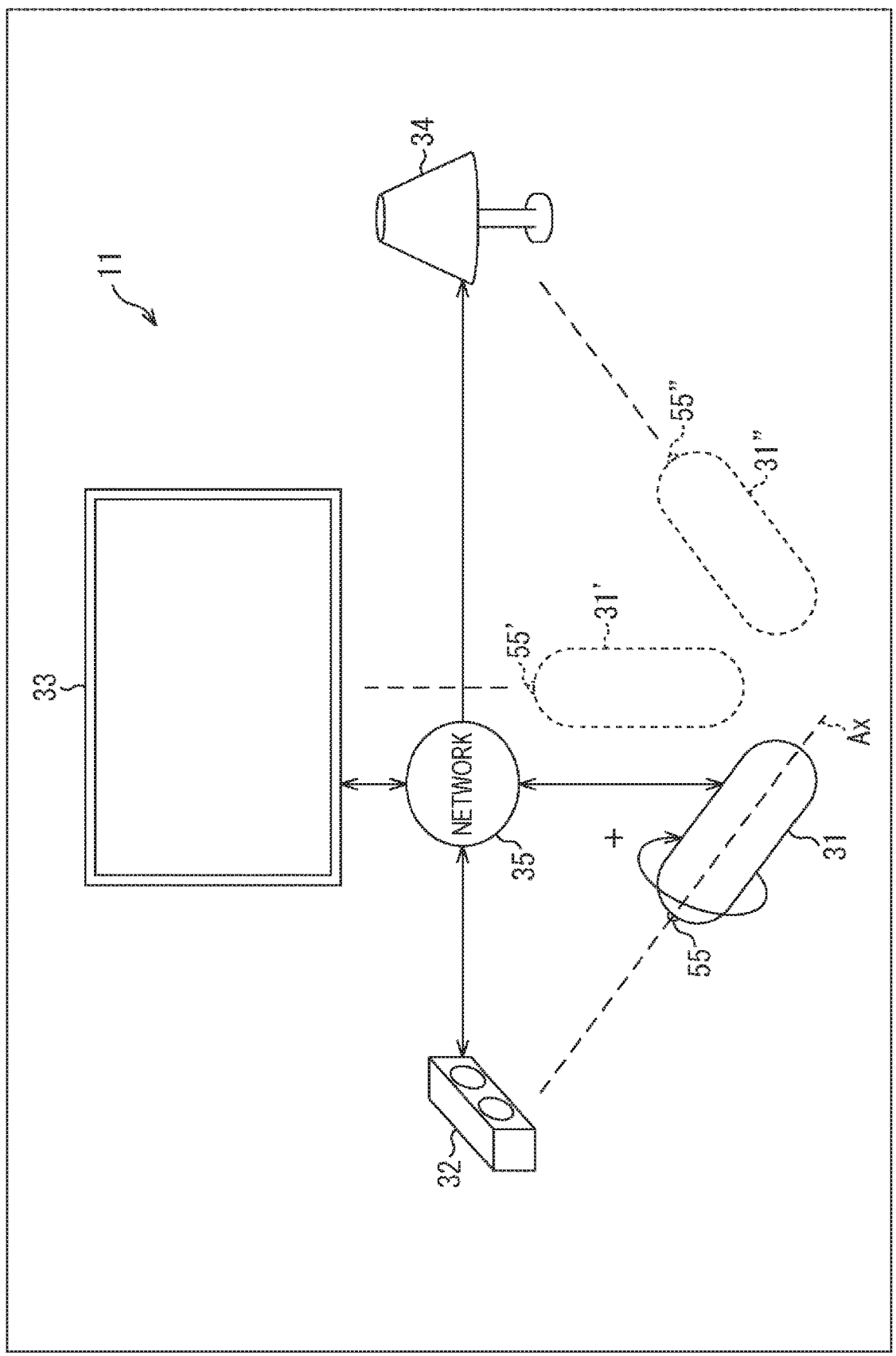
FIG. 1 is a diagram illustrating a control system according to a first embodiment of the present disclosure.

Preferred embodiments of the present disclosure will be described below in detail with reference to the accompanying drawings. Note that, in the present specification and drawings, components having substantially the same functional configurations are denoted by the same reference numerals, and the description thereof will thus not be repeated.

Modes for carrying out the present technology will be described below. The description will be made in the order below.

1. First Embodiment
2. Second Embodiment
3. Modified example
4. Example of execution by software

1. First Embodiment

A control device of the present disclosure allows for an operation in a natural manner for switching between and remotely operating a plurality of control target devices.

FIG. 1 illustrates a configuration example of a control system for materializing the control device of the present disclosure.

A control system 11 of the present disclosure includes a controller (control device) 31, a speaker device 32, a television receiver (TV) 33, a lighting device 34, and a wireless communication network 35.

The controller 31 controls, by remote operation, a volume of the speaker device 32, a channel of the television receiver (TV) 33, and brightness of the lighting device 34.

More specifically, each of the speaker device 32, the television receiver (TV) 33, and the lighting device 34 emits infrared light in a light emission pattern in accordance with a unique ID, thereby emitting an infrared light code. The controller 31 includes an infrared light receiving unit 55. When the infrared light receiving unit 55 of the controller 31 is directed toward a device to be controlled (control target device), an infrared light code from the control target device is received. The controller 31 recognizes a device specified on the basis of the infrared code received by the infrared light receiving unit 55 as a control target device.

That is, as indicated by the controller 31 in FIG. 1, to set the speaker device 32 as a control target, the infrared light receiving unit 55 is directed toward the speaker device 32 to allow the infrared light receiving unit 55 to receive an infrared light code of the speaker device 32. Thus, the controller 31 recognizes the speaker device 32 as a control target device.

Furthermore, as indicated by the controller 31', to set the television receiver 33 as a control target, the infrared light receiving unit 55' is directed toward the television receiver 33 to allow an infrared light code from the television receiver 33 to be received. Thus, the controller 31' recognizes the television receiver 33 as a control target device.

Then, as indicated by the controller 31", to set the lighting device 34 as a control target, the infrared light receiving unit 55" is directed toward the lighting device 34 to allow an infrared light code from the lighting device 34 to be received. Thus, the controller 31" recognizes the lighting device 34 as a control target device.

The controller 31, the speaker device 32, the television receiver (TV) 33, and the lighting device 34 can communicate with each other via the wireless communication network 35 such as Wi-Fi or Bluetooth (registered trademark), for example.

The controller 31 establishes a control state by wireless communication via the wireless communication network 35 with a device recognized as a control target on the basis of an infrared light code.

The controller 31 includes an acceleration sensor and a gyro sensor. When a control state is established, for example, as illustrated in FIG. 1, the controller 31 measures the amount of rotation around an axis Ax of a main body in a direction indicated by + or − in the figure. Then, the controller 31 obtains a control parameter for controlling the volume, channel, or brightness in accordance with the measured amount of rotation, generates a control command on the basis of the obtained control parameter, and transmits the control command via the wireless communication network 35 to the control target device.

The speaker device 32, the television receiver (TV) 33, or the lighting device 34 to be controlled controls the volume, channel, and brightness on the basis of the control command transmitted from the controller 31 via the wireless communication network 35. Furthermore, the speaker device 32, the television receiver (TV) 33, or the lighting device 34 to be controlled transmits the state after control by the control command to the controller 31 as feedback information.

The controller 31 receives the feedback information, which indicates the volume, channel, or brightness after being controlled by the control command, transmitted from the speaker device 32, the television receiver (TV) 33, or the lighting device 34.

The controller 31 is provided with a vibration actuator, and the controller 31 controls the vibration actuator to generate vibration indicating the current volume, channel, and brightness in accordance with the feedback information. On the basis of this vibration, a user can recognize, simply by holding the controller 31, the volume, channel, or brightness of the speaker device 32, the television receiver (TV) 33, or the lighting device 34 after being controlled by the control command.

Consequently, the user can control the volume, channel, or brightness, which is a control parameter of the control target, simply by directing the controller 31 toward the device to be controlled and rotating the main body of the controller 31 around the axis Ax. Furthermore, at this time, the controller 31 vibrates in accordance with the feedback information indicating the state of the control target device after the control by the control command. Thus, on the basis of the state of the vibration, the user can recognize the volume, channel, or brightness of the control target device after being controlled by the control command.

As a result, various devices can be remotely operated with a natural operation without moving a line-of-sight between the controller and the control target device.

<Example of Physical Configuration of Controller>

Next, an example of a physical configuration of the controller 31 will be described with reference to FIG. 2. Note that FIG. 2 includes an upper part illustrating a top view and a side view of an external appearance of the main body of the controller 31, and a lower part illustrating a sectional structural view from the top and a sectional structural view from the side.

Figure 2:
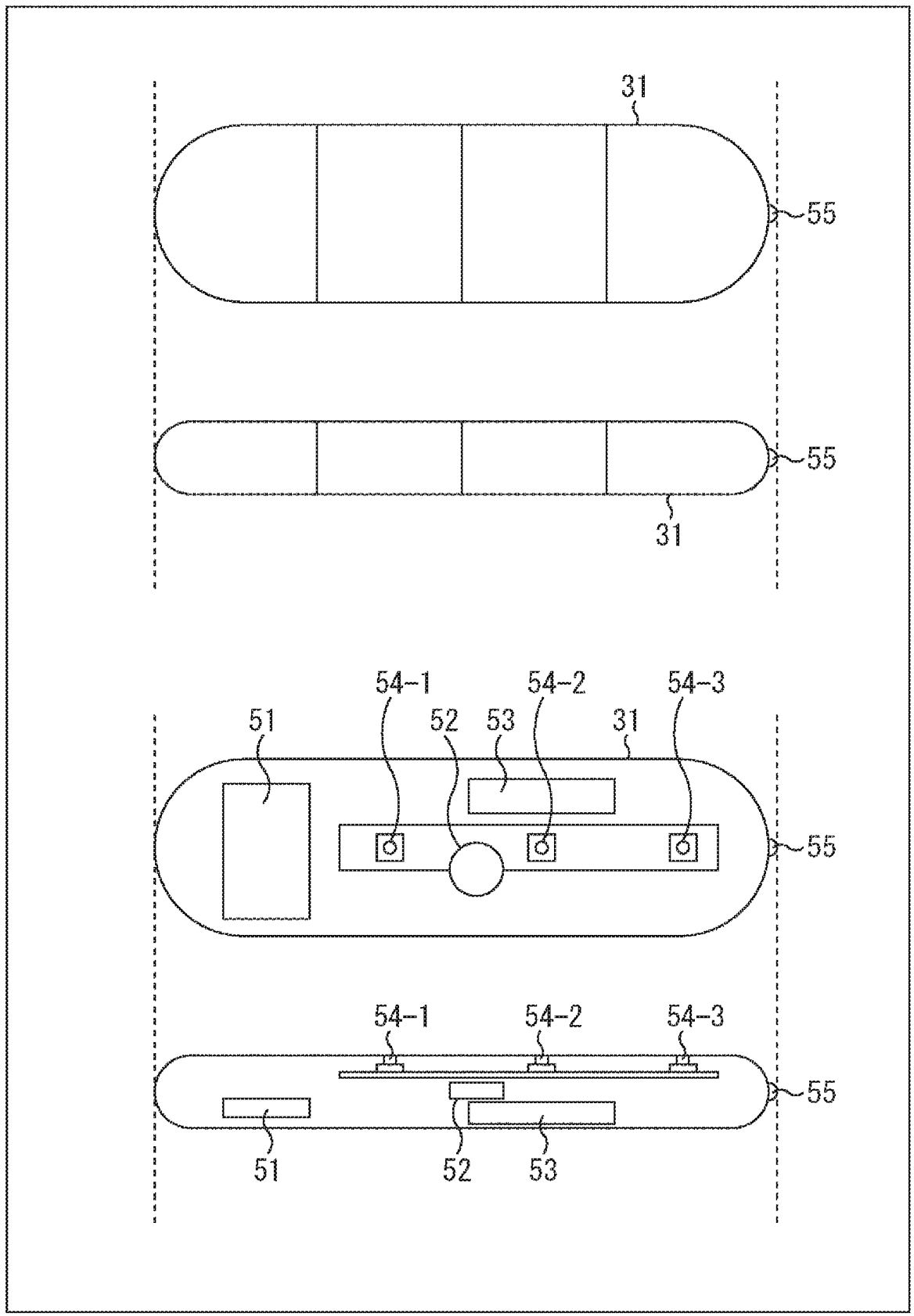
FIG. 2 is a diagram illustrating an example of a physical configuration of a controller in FIG. 1.

As illustrated in the upper part of FIG. 2, the controller 31 is a flat plate-like bar with rounded corners as a whole, and is provided with the infrared light receiving unit 55 at one end thereof. The infrared light receiving unit 55 receives a unique infrared light code transmitted from the speaker device 32, the television receiver (TV) 33, or the lighting device 34 described above. That is, the controller 31 is held with the infrared light receiving unit 55 on the right in the figure directed toward the control target device.

Furthermore, the controller 31 includes a control module 51, a speaker 52, a vibration actuator 53, tactile switches 54-1 to 54-3, and the infrared light receiving unit 55 therein, as illustrated in the lower part of FIG. 2.

Figure 4:
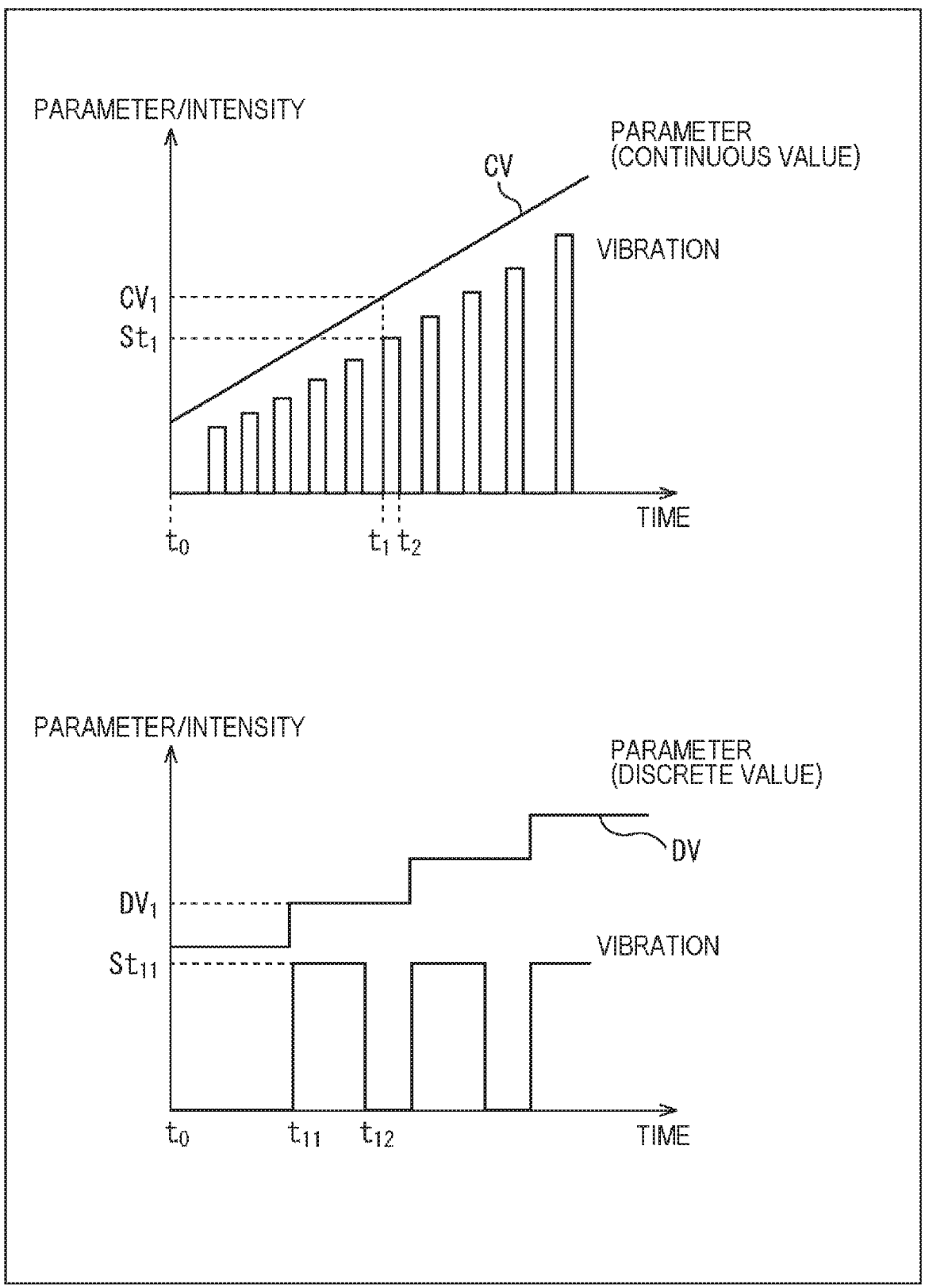
FIG. 4 illustrates vibration of a vibration actuator caused by a parameter, which is a discrete variable, and vibration caused by a parameter, which is a continuous variable.

The control module 51 includes a processor that controls the overall operation of the controller 31, and the like. More specifically, the control module 51 includes a control unit 71 (FIG. 4), an acceleration sensor 72 (FIG. 4), a gyro sensor 73 (FIG. 4), and a communication unit 74 (FIG. 4). Note that the control unit 71 (FIG. 4), the acceleration sensor 72 (FIG. 4), the gyro sensor 73 (FIG. 4), and the communication unit 74 (FIG. 4) will be described later in detail with reference to FIG. 4.

The speaker 52 is controlled by the control module 51 and, on the basis of information indicating that communication with a control target device to be remotely controlled has been established and feedback information, generates sound for notification of various states of the control target device after a remote operation.

The vibration actuator 53 is controlled by the control module 51 and, on the basis of information indicating that communication with a control target device to be remotely controlled has been established and feedback information, generates vibration for notification of various states of the control target device after a remote operation.

The tactile switches 54-1 to 54-3 are in contact with an exterior surface from the inside as illustrated in the upper part of FIG. 2, and have a structure that allows for clicking like a button with a gentle press with a finger from the outside to output, to the control module 51, an operation signal in accordance with an operation to be performed. Note that, in a case where it is not necessary to particularly distinguish among the tactile switches 54-1 to 54-3, each of the tactile switches 54-1 to 54-3 is simply referred to as the tactile switch 54, and other configurations are referred to in a similar way.

The infrared light receiving unit 55 receives an infrared light code transmitted from the speaker device 32, the television receiver (TV) 33, or the lighting device 34, which is a control target device, and outputs, to the control module 51, a signal corresponding to the received infrared light code.

That is, the controller 31 is of a size appropriate to be held by a hand of a human, who is a user, and is held during use with the infrared light receiving unit 55 directed toward the direction (forward) where the control target device is located. Then, with the controller 31 held in hand, the user controls the control target device by rotating the controller 31 around the axis Ax in FIG. 1 in a direction indicated by + or − in the figure.

<Configuration Example of Controller>

Next, a configuration example of the controller 31 will be described in detail with reference to FIG. 3.

The controller 31 includes the control module 51, the speaker 52, the vibration actuator 53, the tactile switches 54-1 to 54-3, and the infrared light receiving unit 55 described above. Furthermore, the control module 51 includes the control unit 71, the acceleration sensor 72, the gyro sensor 73, and the communication unit 74.

The control unit 71 includes a processor and the like, and controls the overall operation of the control module 51.

The acceleration sensor 72 measures a three-dimensional acceleration of the main body of the controller 31, and outputs the measured acceleration to the control unit 71.

The gyro sensor 73 detects an angular velocity and an angle of the controller 31, and outputs the detected angular velocity and angle to the control unit 71.

The communication unit 74 establishes a control state by communicating with the speaker device 32, the television receiver (TV) 33, or the lighting device 34, which is a control target device, via the wireless communication network 35 such as Wi-Fi or Bluetooth, and transmits a command in accordance with a control parameter to control the control target device.

Here, "the controller 31 establishes a control state with a specific device" means "the controller 31 recognizes a specific device as a control target device and puts it into a controllable state".

The control unit 71 detects whether or not there is an infrared light code from the control target device on the basis of a signal output from the infrared light receiving unit 55 in accordance with whether or not infrared light has been received.

Upon receiving the infrared light code, the control unit 71 specifies the control target on the basis of the infrared light code, and controls the communication unit 74 to establish a control state with the control target device via the wireless communication network 35.

At this time, the control unit 71 may control the speaker 52 to give a sound notification that the control state has been established.

Furthermore, when the control state is established, the control target device gives a notification of information indicating the current volume, channel, and brightness as feedback information. Thus, the control unit 71 controls the vibration actuator 53 to generate vibration corresponding to the current volume, channel, and brightness of the control target device on the basis of the feedback information, and controls the speaker 52 to output a corresponding sound.

Such an operation allows a user to recognize that a control state has been established, and also to recognize the current state of the control target device.

When the control state is established, the control target device is put into a controllable state. On the basis of information regarding the acceleration from the acceleration sensor 72 and information regarding the angular velocity and the angle from the gyro sensor 73, the control unit 71 detects a change in position of the controller 31, thereby calculating, for example, the amount of rotation around the axis Ax.

The control unit 71 calculates a control parameter of the control target device in accordance with the obtained amount of rotation, generates a corresponding control command, and controls the communication unit 74 to transmit the control command to the control target device.

<Operation of Vibration Actuator>

On the basis of the feedback information supplied from the control target device, the vibration actuator 53 generates vibration in accordance with the current control parameter of the control target device.

Here, since the control target is the speaker device 32, the television receiver (TV) 33, or the lighting device 34, the control parameter is a control parameter for controlling the volume, channel, and brightness. Here, control parameters for the volume and brightness are continuous variables, while a control parameter for controlling the channel is a discrete variable.

For this reason, for a control parameter for controlling a volume of a speaker or brightness of an illumination, as illustrated in an upper part of FIG. 4, the control unit 71 controls the vibration actuator 53 to generate vibration at an intensity in accordance with the magnitude of the control parameter and for a period of time in accordance with the magnitude of the control parameter, and controls the speaker 52 to output a corresponding sound.

Note that, in both the upper part and lower part of FIG. 4, the vertical axis represents the intensity of vibration of the vibration actuator 53 (and the volume of the sound output from the speaker 52) and a control parameter CV, and the horizontal axis represents the time expressing an interval between vibrations of the vibration actuator 53 and an interval between output sounds output from the speaker 52.

That is, as illustrated in the upper part of FIG. 4, when the control parameter, which represents the volume or brightness, which is a continuous variable, is CV1, the vibration actuator 53 outputs vibration of strength St1 for a period from time t1 to time t2 at a time interval of time t0 to t1, and the speaker 52 outputs sound of a volume corresponding to strength St1 for a period from time t1 to time t2 at a time interval of time t0 to t1.

That is, the vibration actuator 53 vibrates at a time interval and intensity in accordance with the magnitude of the control parameter CV, and the speaker 52 outputs sound at a corresponding timing and volume.

Furthermore, for a control parameter for controlling the channel of the television receiver 33, as illustrated in the lower part of FIG. 4, the control unit 71 controls the vibration actuator 53 to cause the vibration actuator 53 to vibrate and the speaker 52 to output sound at the same intensity regardless of the magnitude of the control parameter, at a time interval in accordance with the magnitude of the control parameter, and for a period of time longer than the control parameter, which is a continuous variable.

That is, for example, when the control parameter, which is a discrete variable indicating the channel, is DV1, the vibration actuator 53 outputs vibration of strength St11 for a period from time t11 to time t12 at a time interval of time t0 to t11, and the speaker 52 outputs sound at a similar interval and length and at a volume corresponding to a similar strength St1.

That is, the vibration actuator 53 vibrates at a constant intensity St11, for a constant period from time t11 to time t12, and at a time interval in accordance with the magnitude of a control parameter DV, and the speaker 52 outputs sound at a corresponding timing and volume.

In this way, it is possible to recognize the state of the control target device by different vibrations or sounds in accordance with whether the control parameter is a continuous variable or a discrete variable. As a result, unlike a case where feedback information is displayed on a display or the like, it is possible to check the state of the control target device without moving a line-of-sight.

<Configuration Example of Speaker Device>

Next, a configuration example of the speaker device 32 will be described with reference to a block diagram of FIG. 5.

The speaker device 32 receives, for example, an audio signal from an audio amplifier (not illustrated) or an audio signal from the television receiver (TV) 33 from the outside, and outputs sound such as amplified sound.

More specifically, the speaker device 32 includes a control unit 91, an infrared light emitting unit 92, a communication unit 93, a volume controller 94, a speaker 95, and an external input unit 96.

The control unit 91 includes a processor and the like, and controls the overall operation of the speaker device 32.

The infrared light emitting unit 92 is controlled by the control unit 91, and emits an infrared light code including the unique ID of the speaker device 32 in a predetermined pattern.

The communication unit 93 is controlled by the control unit 91, communicates with the controller 31 via the wireless communication network 35 such as Wi-Fi or Bluetooth, receives a control command in accordance with a control parameter for controlling the volume, and outputs the control command to the control unit 91.

The volume controller 94 is controlled by the control unit 91, and outputs an input audio signal to the speaker 95 at a volume in accordance with a control command to cause the speaker 95 to output the audio signal as sound.

The external input unit 96 receives an input of an audio signal from an audio amplifier (not illustrated) or an audio signal from the television receiver (TV) 33, and outputs the audio signal to the control unit 91.

The control unit 91 acquires a control command received via the communication unit 93, and supplies the control command to the volume controller 94. The volume controller 94 adjusts the volume of the speaker 95 on the basis of a control command, and causes the speaker 95 to output an audio signal supplied via the external input unit 96 as sound.

<Configuration Example of Television Receiver>

Next, a configuration example of the television receiver 33 will be described with reference to a block diagram of FIG. 6.

For example, when a predetermined channel is selected, the television receiver (TV) 33 receives a broadcast wave of the selected channel, and decodes each of an image signal and an audio signal from the broadcast wave, thereby generating and displaying an image on the basis of an image signal obtained as a result of the decoding, and also outputting sound on the basis of an audio signal obtained as a result of the decoding.

More specifically, the television receiver 33 includes a control unit 111, an infrared light emitting unit 112, a communication unit 113, a channel controller 114, a tuner 115, a display unit 116, a speaker 117, a volume controller 118, and an external input unit 119.

The control unit 111 includes a processor and the like, and controls the overall operation of the television receiver 33.

The infrared light emitting unit 112 is controlled by the control unit 111, and emits an infrared light code including the unique ID of the television receiver 33 in a predetermined pattern.

The communication unit 113 is controlled by the control unit 111, communicates with the controller 31 via the wireless communication network 35 such as Wi-Fi or Bluetooth, receives a control command in accordance with a control parameter for controlling the channel, and outputs the control command to the control unit 111.

The control unit 111 controls the channel controller 114 to control the tuner 115 to select a channel based on the control command.

The tuner 115 is controlled by the channel controller 114, receives a broadcast wave from a channel specified on the basis of the control command, and decodes the received broadcast wave to generate an image signal and an audio signal. Then, the tuner 115 outputs the generated image signal to cause the display unit 116 to display the image signal, and outputs the generated audio signal to cause the speaker 117 to output the audio signal as sound.

The external input unit 119 receives an input of an image signal and an audio signal from an external device (not illustrated), and outputs the signals to the control unit 111.

That is, the control unit 111 acquires the received control command via the communication unit 113, and controls the channel controller 114 on the basis of the control command to cause the tuner 115 to receive the broadcast wave of the channel specified by the control command.

The tuner 115 receives the broadcast wave of the corresponding channel, decodes a signal of the received broadcast wave, extracts an image signal and an audio signal, outputs the image signal to cause the display unit 116 to display the image signal, and outputs the audio signal to cause the speaker 117 to output the audio signal as sound.

The volume controller 118 is controlled by the control unit 111, and outputs an input audio signal to the speaker 117 at a volume in accordance with a control command to cause the speaker 117 to output the audio signal as sound. Note that the configuration of the volume controller 118 is basically similar to that of the speaker device 32. For this reason, also on the television receiver 33, the volume can be remotely operated by the controller 31, but here, only the operation of remotely operating the channel will be described for the television receiver 33.

The control unit 111 acquires the received control command via the communication unit 113, and controls the channel controller 114 on the basis of the control command to control the channel to be received by the tuner 115. Thus, the tuner 115 receives the broadcast wave of the specified channel, decodes the received broadcast wave, generates an image signal and an audio signal, outputs the image signal to cause the display unit 116 to display the image signal as an image, and outputs the audio signal to cause the speaker 117 to output the audio signal as sound.

<Configuration Example of Lighting Device>

The lighting device 34 functions as an indoor lighting fixture.

More specifically, the lighting device 34 includes a control unit 131, an infrared light emitting unit 132, a communication unit 133, an illuminance controller 134, a light emitting unit 135, and an external input unit 136.

The control unit 131 includes a processor and the like, and controls the overall operation of the lighting device 34.

The infrared light emitting unit 132 is controlled by the control unit 131, and emits an infrared light code including the unique ID of the lighting device 34 in a predetermined pattern.

The communication unit 133 is controlled by the control unit 131, communicates with the controller 31 via the wireless communication network 35 such as Wi-Fi or Bluetooth, receives a control command in accordance with a control parameter for controlling the brightness, and outputs the control command to the control unit 131.

The illuminance controller 134 is controlled by the control unit 131, and causes the light emitting unit 135 to emit light at a brightness level in accordance with the control command.

The external input unit 136 receives inputs of various signals from an external device (not illustrated), and outputs the signals to the control unit 131.

The control unit 131 acquires the received control command via the communication unit 133, and controls the illuminance controller 134 on the basis of the control command to adjust the brightness of light emitted by the light emitting unit 135.

<Remote Operation Control Processing by Control System in FIG. 1>

Next, remote operation control processing by the control system 11 in FIG. 1 will be described with reference to flowcharts of FIGS. 8 to 13.

Figure 8:
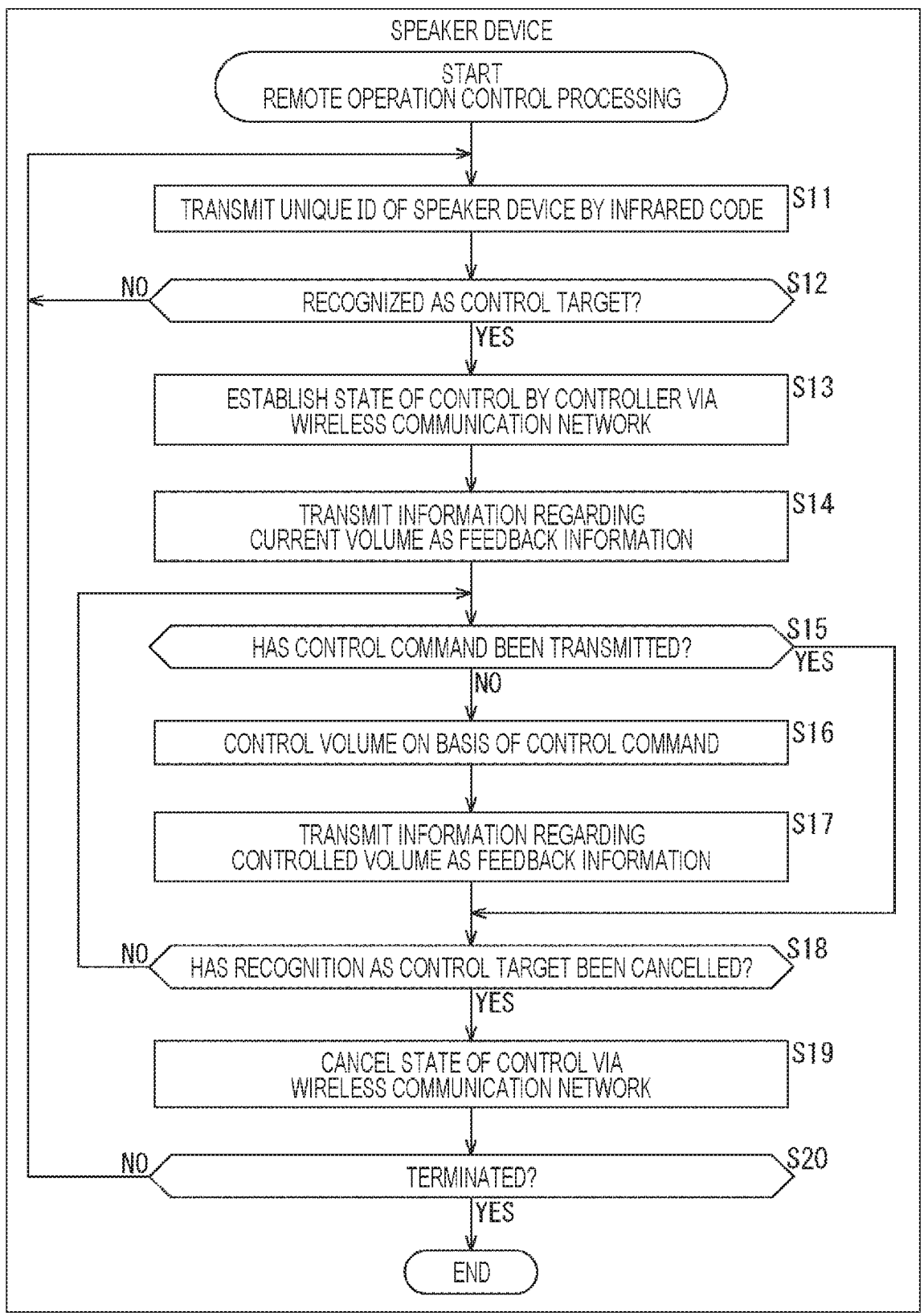
FIG. 8 is a flowchart illustrating remote operation control processing for the speaker device in the control system in FIG. 1.
Figure 9:
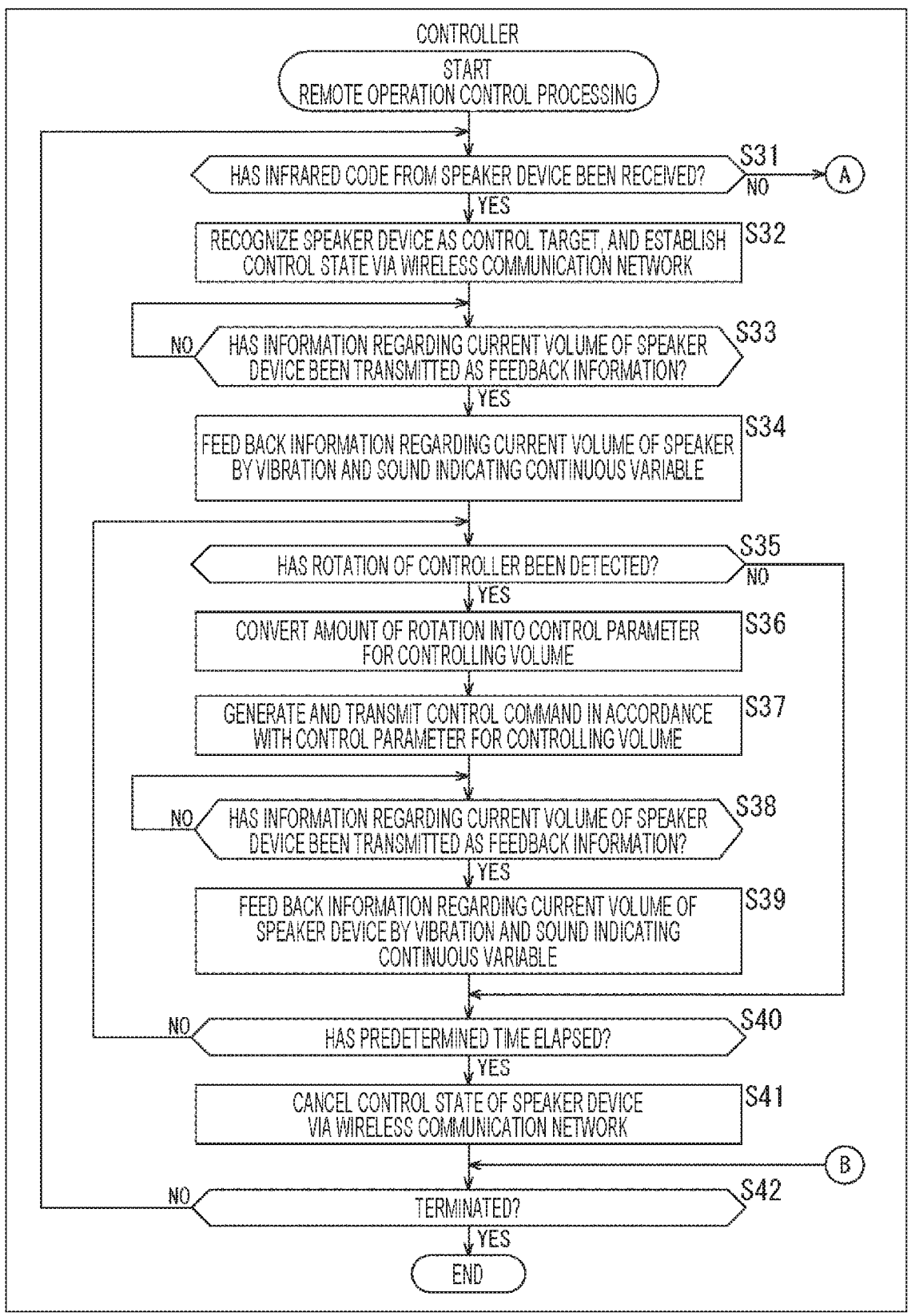
FIG. 9 is a flowchart illustrating remote operation control processing by a controller in the control system in FIG. 1.
Figure 10:
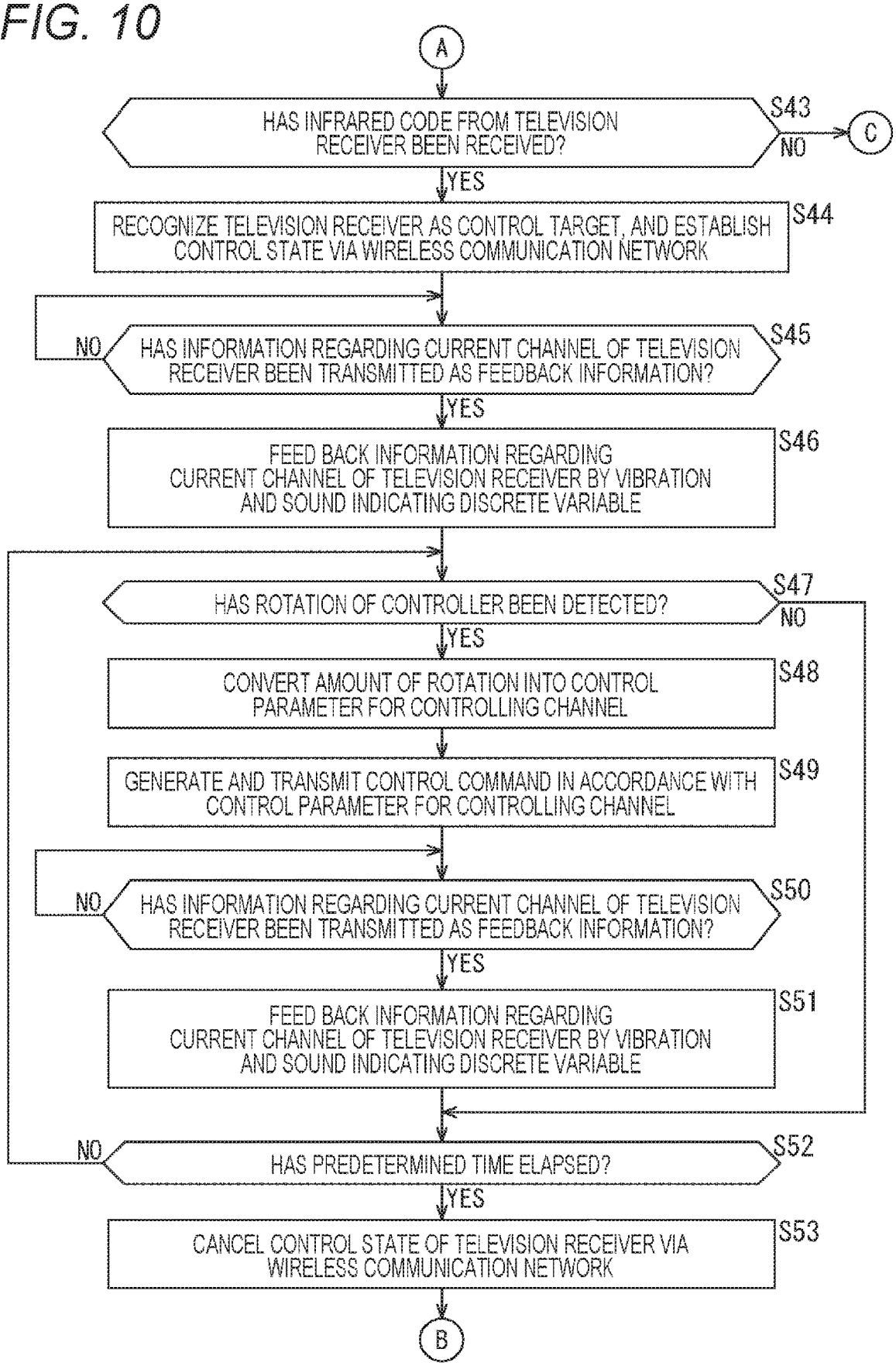
FIG. 10 is a flowchart illustrating remote operation control processing by the controller in the control system in FIG. 1.
Figure 11:
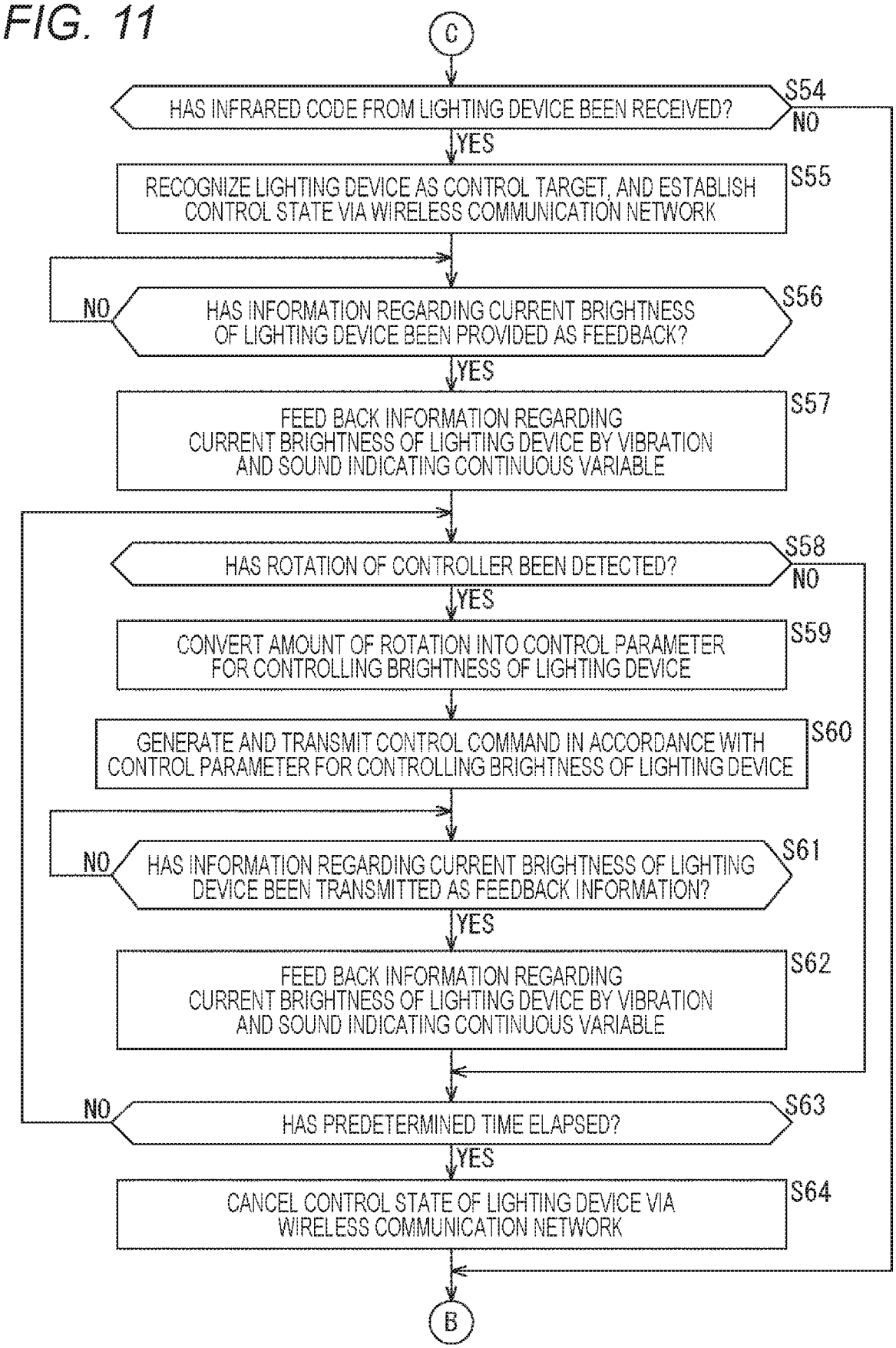
FIG. 11 is a flowchart illustrating remote operation control processing by the controller in the control system in FIG. 1.
Figure 12:
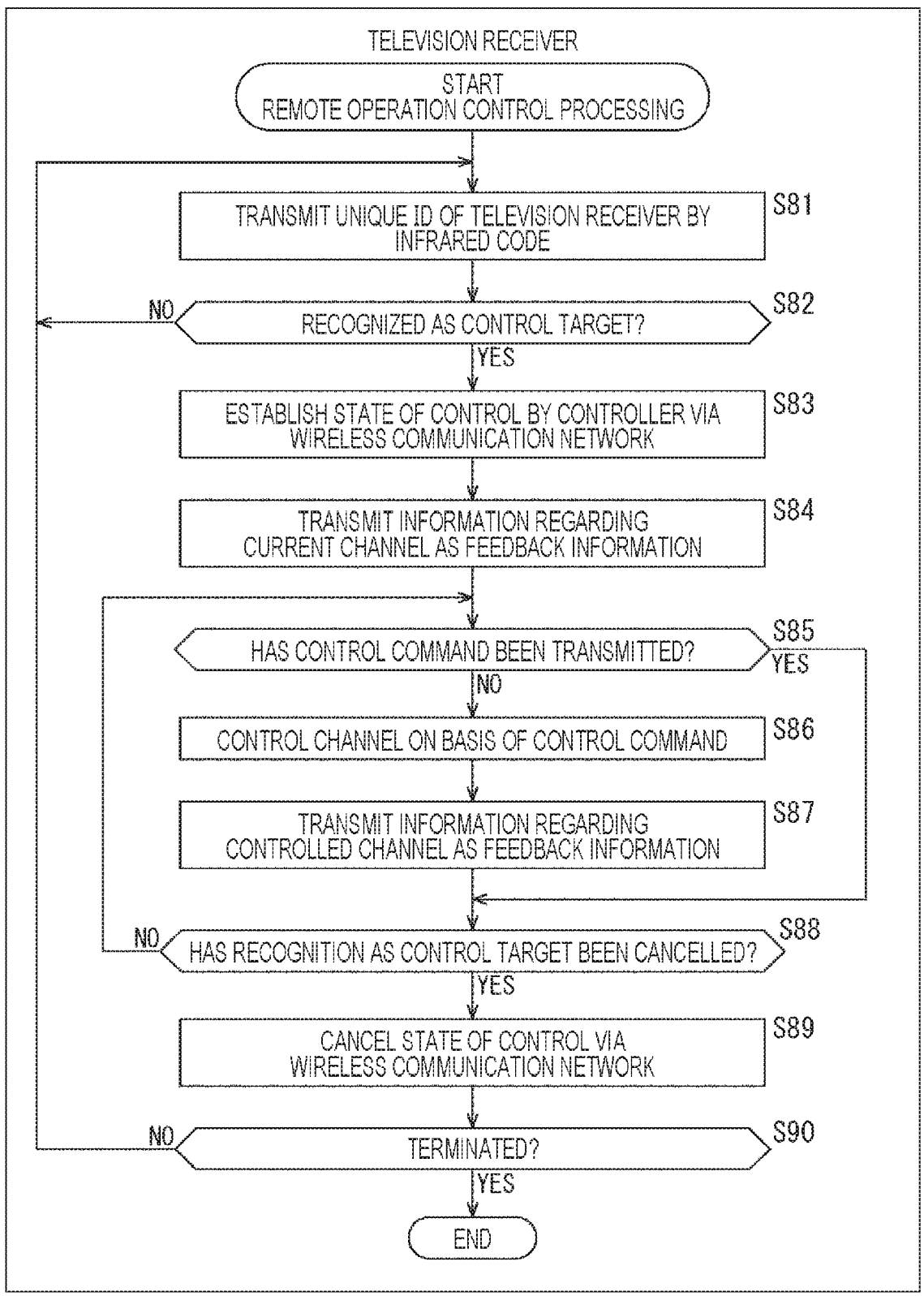
FIG. 12 is a flowchart illustrating remote operation control processing for the television receiver in the control system in FIG. 1.
Figure 13:
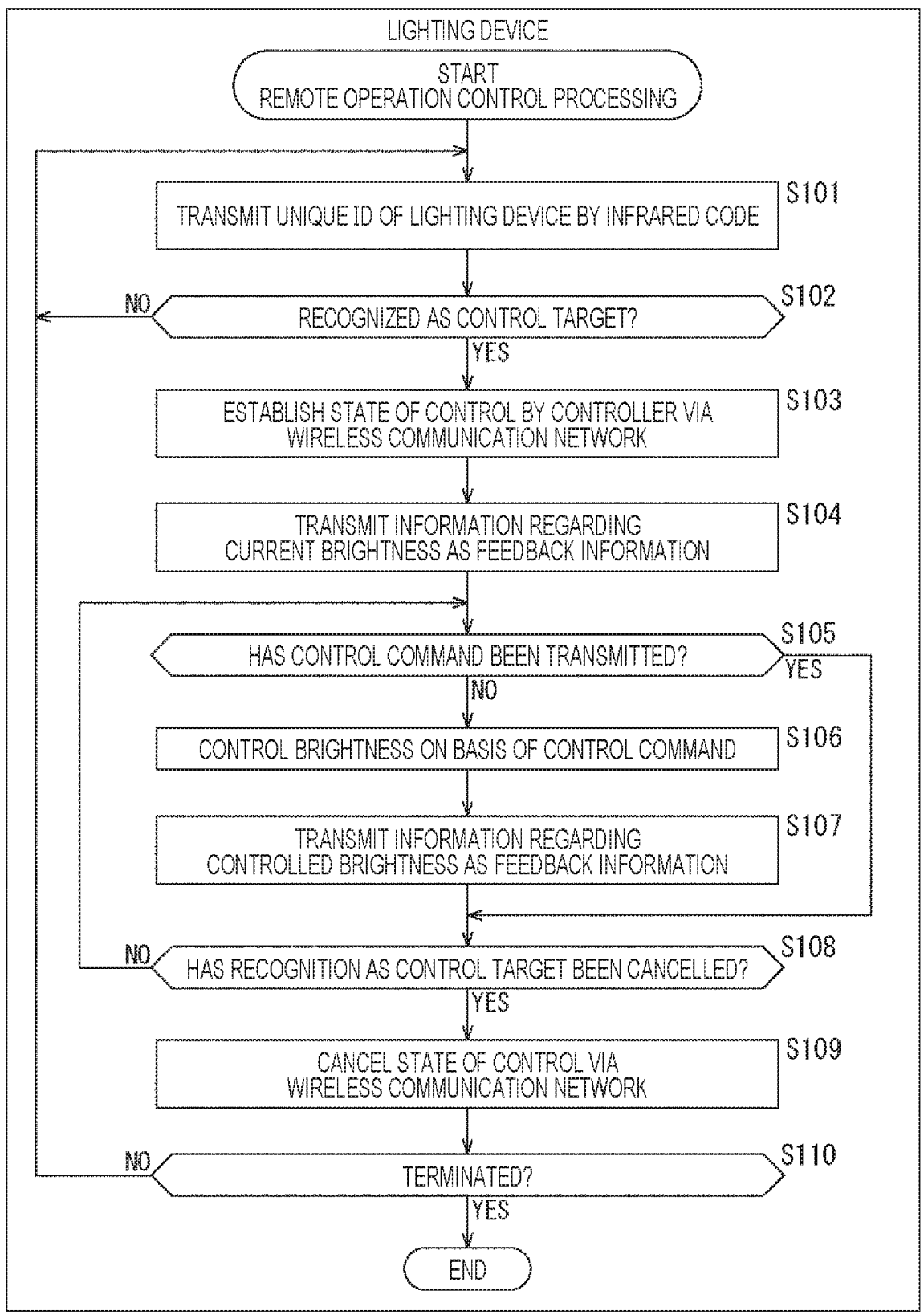
FIG. 13 is a flowchart illustrating remote operation control processing for the lighting device in the control system in FIG. 1.

Note that FIG. 8 is a flowchart illustrating processing by the speaker device 32, FIGS. 9 to 11 are flowcharts illustrating processing by the controller 31, FIG. 12 is a flowchart illustrating processing by the television receiver 33, and FIG. 13 is a flowchart illustrating processing by the lighting device 34.

Processing for controlling the speaker device 32 will be described, and processing for controlling the television receiver 33 and the lighting device 34 will be described.

<Remote Operation Control Processing for Speaker Device>

First, remote operation control processing for a speaker device will be described.

In step S11 (FIG. 8), the control unit 91 controls the infrared light emitting unit 92 to emit an infrared light code indicating the unique ID of the speaker device 32 in a predetermined pattern.

In step S12, the control unit 91 controls the communication unit 93 to determine whether or not a notification of recognition as a control target by the controller 31 and establishment of a control state has been given. In a case where a notification of recognition as a control target and establishment of a control state has not been given, the processing returns to step S11.

That is, until recognition as a control target is made and a control state is established, the speaker device 32 repeats the processing of steps S11 and S12.

On the other hand, in step S31 (FIG. 9), the control unit 71 of the controller 31 controls the infrared light receiving unit 55 to determine whether or not an infrared light code including the ID for identifying the speaker device 32 has been received. For example, in a case where a user holds the controller 31 and directs the infrared light receiving unit 55 toward the speaker device 32 in order to set the speaker device 32 as a control target and an infrared light code from the speaker device 32 is thus received, it is determined in step S31 that, for example, the infrared light code from the speaker device 32 has been received, and the processing proceeds to step S32.

In step S32, the control unit 71 controls the communication unit 74 to notify the speaker device 32 that the speaker device 32 has been recognized as a control target and that a control state has been established via the wireless communication network 35.

By this processing, in step S12 (FIG. 8), a notification indicating that recognition as a control target has been made and that a control state has been established is received, and the processing proceeds to step S13.

In step S13, the control unit 91 controls the communication unit 93 to establish a state of control by the controller 31 via the wireless communication network 35.

In step S14, the control unit 91 makes an inquiry to the volume controller 94, reads information regarding a control parameter indicating the current volume, and controls the communication unit 93 to transmit that information as feedback information to the controller 31.

In step S33 (FIG. 9), the control unit 71 of the controller 31 controls the communication unit 74 to determine whether or not feedback information has been transmitted from the speaker device 32 that is the control target, and similar processing is repeated until feedback information is transmitted. In a case where it is determined in step S33 that feedback information has been transmitted by the processing of step S14, the processing proceeds to step S34.

In step S34, the control unit 71 controls the vibration actuator 53 to, as described with reference to FIG. 4, feedback information regarding the current volume of the speaker device 32 by generating vibration at a time interval and intensity corresponding to a control parameter that corresponds to the current volume of the speaker device 32, which is the feedback information received via the communication unit 74. Furthermore, the control unit 71 controls the speaker 52 to, as described with reference to FIG. 4, feedback information regarding the current volume of the speaker device 32 by generating sound at a time interval and intensity (volume) corresponding to a control parameter that corresponds to the current volume of the speaker device 32, which is the feedback information received via the communication unit 74.

That is, by the above processing, simply by directing the infrared light receiving unit 55 toward the speaker device 32 to be controlled, a user can establish a control state, recognize by vibration and sound that the control state has been established, and recognize the current volume of the speaker device 32.

In step S35, on the basis of detection results of the acceleration sensor 72 and the gyro sensor 73, the control unit 71 determines whether or not, for example, a twisting rotation around the axis Ax in FIG. 1 in a direction of + or − in the figure has been applied to the main body of the controller 31 with the tactile switch 54 held down. In step S35, in a case where it is determined that, for example, a twisting rotation around the axis Ax in FIG. 1 has been applied to the main body of the controller 31 with the tactile switch 54 held down, the processing proceeds to step S36.

In step S36, on the basis of the detection results of the acceleration sensor 72 and the gyro sensor 73, the control unit 71 detects the amount of rotation and generates a control parameter in accordance with the amount of rotation. That is, in accordance with the amount of rotation, the control unit 71 generates a control parameter regarding, for example, how much the volume of the speaker device 32 should be turned up or turned down.

In step S37, the control unit 71 generates a control command in accordance with the generated control parameter, and controls the communication unit 74 to transmit the control command to the speaker device 32.

In step S15 (FIG. 8), the control unit 91 of the speaker device 32 controls the communication unit 93 to determine whether or not a control command has been transmitted from the controller 31. In step S15, when the control command is transmitted by the processing of step S37, the processing proceeds to step S16.

In step S16, the control unit 91 controls the volume controller 94 to control the volume of the speaker 95 in accordance with a control parameter corresponding to the control command. That is, on the basis of the control parameter, the control unit 91 instructs the volume controller 94 how much the volume should be turned up or how much the volume should be turned down. On the basis of this instruction, the volume controller 94 controls the volume output from the speaker 95.

In step S17, the control unit 91 makes an inquiry to the volume controller 94 to acquire information regarding the current volume, and controls the communication unit 93 to transmit that information as feedback information to the controller 31.

In step S18, the control unit 91 controls the communication unit 93 to determine whether or not the controller 31 has given a notification of cancellation of recognition as a control target. In a case where a notification of cancellation of recognition as a control target has not been given, the processing returns to step S15.

Furthermore, in a case where a control command has not been transmitted in step S15, the processing of steps S16 and S17 is skipped.

That is, the processes of steps S15 to S18 is repeated until the controller 31 gives a notification of cancellation of recognition as a control target, and the processing of controlling the volume is repeated each time a control command is transmitted.

In step S38 (FIG. 9), the control unit 71 of the controller 31 controls the communication unit 74 to determine whether or not feedback information has been transmitted from the speaker device 32, and similar processing is repeated until feedback information is transmitted. In step S38, in a case where feedback information has been transmitted by the processing of step S17, the processing proceeds to step S39.

In step S39, the control unit 71 controls the communication unit 74 to receive the transmitted feedback information. Then, the control unit 71 controls the vibration actuator 53 to, as described with reference to FIG. 4, generate vibration at a time interval and intensity corresponding to a control parameter that corresponds to the current volume, which is a continuous variable, of the speaker device 32, which is the feedback information received via the communication unit 74. Furthermore, the control unit 71 controls the speaker 52 to, as described with reference to FIG. 4, generate sound at a time interval and intensity (volume) corresponding to a control parameter that corresponds to the current volume, which is a continuous variable, of the speaker device 32, which is the feedback information received via the communication unit 74.

In step S40, in a case where at least one control command has been transmitted, the control unit 71 determines whether or not the time elapsed since transmission of the last control command is equal to or longer than a predetermined time. In a case where no control command has been transmitted, the control unit 71 determines whether or not the time elapsed since establishment of the control state is equal to or longer than a predetermined time. In step S40, in a case where neither the time elapsed since transmission of the last control command nor the time elapsed since establishment of the control state is equal to or longer than the predetermined time, the processing returns to step S35.

Furthermore, in a case where no rotation of the main body of the controller 31 has been detected in step S35, the processing of steps S36 to S39 is skipped.

That is, in a case where at least one control command has been transmitted, until at least the predetermined time elapses after transmission of the last control command, or, in a case where no control command has been transmitted, until at least the predetermined time elapses after establishment of the control state, the processing of steps S35 to S40 is repeated, and a state continues in which the controller 31 can accept a rotation operation for controlling the volume of the speaker device 32.

Then, in step S40, in a case where at least one control command has been transmitted and the time elapsed since transmission of the last control command is equal to or longer than the predetermined time, or in a case where no control command has been transmitted and the time elapsed since establishment of the control state is equal to or longer than the predetermined time, the processing proceeds to step S41.

In step 41, the control unit 71 controls the communication unit 74 to notify the speaker device 32 of cancellation of recognition as a control target, and cancels the control state.

In step S42, the control unit 71 determines whether or not an instruction to terminate the remote operation control processing has been given. In a case where a termination instruction has not been given, the processing returns to step S31. Furthermore, in step S42, in a case where an instruction to terminate the remote operation control processing has been given, the processing ends.

Accordingly, on the speaker device 32 side, in a case where a notification of cancellation of recognition as a control target has been received in step S18 (FIG. 8), the processing proceeds to step S19.

In step S19, the control unit 91 controls the communication unit 93 to cancel the state of control by the controller 31 via the wireless communication network 35.

In step S20, the control unit 91 determines whether or not an instruction to terminate the remote operation control processing has been given. In a case where a termination instruction has not been given, the processing returns to step S11. Furthermore, in step S20, in a case where an instruction to terminate the remote operation control processing has been given, the processing ends.

That is, after a control state has been established, while the controller 31 is kept being rotated at an interval of less than a predetermined time to continuously transmit control commands for adjusting the volume to the speaker device 32, or for a predetermined time with no control command transmitted, a state continues in which the volume can be adjusted by rotating the controller 31 to transmit a control command for controlling the volume to the speaker device 32.

Then, when processing of controlling the volume of the speaker device 32 has not been performed for a predetermined time, the control state is cancelled.

That is, a user can hold the controller 31 and direct the infrared light receiving unit 55 toward the speaker device 32 to be controlled to prompt establishment of a control state. When a control state has been established, the user can recognize establishment of the control state by vibration and sound, and at the same time, recognize the state of the volume of the speaker device 32 at that time.

Moreover, after the control state has been established, a control command for adjusting the volume of the speaker device 32 can be transmitted by simply performing a twisting operation around the axis Ax in FIG. 1 while holding down the tactile switch 54. Then, the volume of the speaker device 32 is adjusted on the basis of the control command. At this time, information indicating the current volume is returned as feedback information from the speaker device 32, and can be recognized by vibration and sound.

Then, after the volume of the speaker device 32 has reached a desired level, when a twisting operation for controlling the volume of the speaker device 32 using the controller 31 has not been performed for at least a predetermined time, the control state is cancelled.

With such a series of natural operations, the speaker device 32 can be remotely operated.

<Remote Operation Control Processing for Television Receiver>

Next, remote operation control processing for the television receiver will be described.

In step S81 (FIG. 12), the control unit 111 controls the infrared light emitting unit 112 to emit an infrared light code indicating the unique ID for identifying the television receiver 33 in a predetermined pattern.

In step S82, the control unit 111 controls the communication unit 113 to determine whether or not a notification of recognition as a control target by the controller 31 and establishment of a control state has been given. In a case where a notification of recognition as a control target and establishment of a control state has not been given, the processing returns to step S81.

That is, until recognition as a control target is made and a control state is established, the television receiver 33 repeats the processing of steps S81 and S82.

On the other hand, in step S31 (FIG. 9), in a case where an infrared code has not been transmitted from the speaker device 32, the processing proceeds to step S43.

In step S43 (FIG. 10), the control unit 71 of the controller 31 controls the infrared light receiving unit 55 to determine whether or not an infrared light code including the ID for identifying the television receiver 33 has been received. For example, in a case where a user holds the controller 31 and directs the infrared light receiving unit 55 toward the television receiver 33 in order to set the television receiver 33 as a control target and an infrared light code from the television receiver 33 is thus received, for example, the infrared light code from the television receiver 33 is received in step S43, and the processing proceeds to step S44.

In step S44, the control unit 71 controls the communication unit 74 to notify the television receiver 33 that the television receiver 33 has been recognized as a control target and that a control state has been established via the wireless communication network 35.

By this processing, in step S82 (FIG. 12), a notification indicating that recognition as a control target has been made and that a control state has been established is received, and the processing proceeds to step S83.

In step S83, the control unit 111 controls the communication unit 113 to establish a state of control by the controller 31 via the wireless communication network 35.

In step S84, the control unit 111 makes an inquiry to the channel controller 114, reads information regarding a control parameter indicating the current channel, and controls the communication unit 113 to transmit that information as feedback information to the controller 31.

In step S45 (FIG. 10), the control unit 71 of the controller 31 controls the communication unit 74 to determine whether or not feedback information has been transmitted from the television receiver 33 that is the control target, and similar processing is repeated until feedback information is transmitted. In a case where it is determined in step S45 that feedback information has been transmitted by the processing of step S84, the processing proceeds to step S46.

In step S46, the control unit 71 controls the vibration actuator 53 to, as described with reference to FIG. 4, generate vibration at a time interval and intensity corresponding to a control parameter that corresponds to the current channel, which is a discrete variable, of the television receiver 33, which is the feedback information received via the communication unit 74. Furthermore, the control unit 71 controls the speaker 52 to, as described with reference to FIG. 4, generate sound at a time interval and intensity (volume) corresponding to a control parameter that corresponds to the current channel, which is a discrete variable, of the television receiver 33, which is the feedback information received via the communication unit 74.

That is, by the above processing, simply by directing the infrared light receiving unit 55 toward the television receiver 33 to be controlled, a user can establish a control state, recognize by vibration and sound that the control state has been established, and recognize the current channel of the television receiver 33.

In step S47, on the basis of detection results of the acceleration sensor 72 and the gyro sensor 73, the control unit 71 determines whether or not, for example, a twisting rotation around the axis Ax in FIG. 1 has been applied to the main body of the controller 31 with the tactile switch 54 held down. In step S47, in a case where it is determined that, for example, a twisting rotation around the axis Ax in FIG. 1 has been applied to the main body of the controller 31 with the tactile switch 54 held down, the processing proceeds to step S48.

In step S48, on the basis of the detection results of the acceleration sensor 72 and the gyro sensor 73, the control unit 71 detects the amount of rotation and generates a control parameter in accordance with the amount of rotation. That is, in accordance with the amount of rotation, the control unit 71 generates a control parameter regarding, for example, how much the channel of the television receiver 33 should be turned up or turned down.

In step S49, the control unit 71 generates a control command in accordance with the generated control parameter, and controls the communication unit 74 to transmit the control command to the television receiver 33.

In step S85 (FIG. 12), the control unit 111 of the television receiver 33 controls the communication unit 113 to determine whether or not a control command has been transmitted from the controller 31. In step S85, when the control command is transmitted by the processing of step S49, the processing proceeds to step S86.

In step S86, the control unit 111 controls the channel controller 114 to control the channel of the tuner 115 on the basis of a control parameter corresponding to the control command.

That is, on the basis of the control parameter, the control unit 111 instructs the channel controller 114 how much the channel should be turned up or how much the channel should be turned down. The channel controller 114 controls the channel selected by the tuner 115 on the basis of this instruction.

As a result, the channel selected by the tuner 115 is switched, a broadcast wave of the switched and selected channel is received, the received broadcast wave is decoded, and an image signal and an audio signal are generated. Then, an image based on the generated image signal is displayed on the display unit 116, and sound corresponding to the generated audio signal is output from the speaker 117.

In step S87, the control unit 111 makes an inquiry to the channel controller 114 to acquire information regarding the current channel, and controls the communication unit 113 to transmit that information as feedback information to the controller 31.

In step S88, the control unit 111 controls the communication unit 113 to determine whether or not the controller 31 has given a notification of cancellation of recognition as a control target. In a case where a notification of cancellation of recognition as a control target has not been given, the processing returns to step S85.

Furthermore, in a case where a control command has not been transmitted in step S85, the processing of steps S86 and S87 is skipped.

That is, the processes of steps S85 to S88 is repeated until the controller 31 gives a notification of cancellation of recognition as a control target, and the processing of controlling the channel is repeated each time a control command is transmitted.

In step S50 (FIG. 10), the control unit 71 of the controller 31 controls the communication unit 74 to determine whether or not feedback information has been transmitted from the television receiver 33, and similar processing is repeated until feedback information is transmitted. In step S50, in a case where feedback information has been transmitted by the processing of step S87, the processing proceeds to step S51.

In step S51, the control unit 71 controls the communication unit 74 to receive the transmitted feedback information. Then, the control unit 71 controls the vibration actuator 53 to, as described with reference to FIG. 4, generate vibration at a time interval and intensity corresponding to a control parameter that corresponds to the current channel, which is a discrete variable, of the television receiver 33, which is the feedback information received via the communication unit 74. Furthermore, the control unit 71 controls the speaker 52 to, as described with reference to FIG. 4, generate sound at a time interval and intensity (volume) corresponding to a control parameter that corresponds to the current channel, which is a discrete variable, of the television receiver 33, which is the feedback information received via the communication unit 74.

In step S52, in a case where at least one control command has been transmitted, the control unit 71 determines whether or not the time elapsed since transmission of the last control command is equal to or longer than a predetermined time. In a case where no control command has been transmitted, the control unit 71 determines whether or not the time elapsed since establishment of the control state is equal to or longer than a predetermined time. In step S52, in a case where neither the time elapsed since transmission of the last control command nor the time elapsed since establishment of the control state is equal to or longer than the predetermined time, the processing returns to step S47.

Furthermore, in a case where no rotation of the main body of the controller 31 has been detected in step S47, the processing of steps S48 to S51 is skipped.

Then, in step S52, in a case where at least one control command has been transmitted and the time elapsed since transmission of the last control command is equal to or longer than the predetermined time, or in a case where no control command has been transmitted and the time elapsed since establishment of the control state is equal to or longer than the predetermined time, the processing proceeds to step S53.

In step S53, the control unit 71 controls the communication unit 74 to notify the television receiver 33 of cancellation of recognition as a control target, and cancels the control state.

Accordingly, on the television receiver 33 side, in a case where a notification of cancellation of recognition as a control target has been received in step S88 (FIG. 12), the processing proceeds to step S89.

In step S89, the control unit 111 controls the communication unit 113 to cancel the control state via the wireless communication network 35.

In step S90, the control unit 111 determines whether or not an instruction to terminate the remote operation control processing has been given. In a case where a termination instruction has not been given, the processing returns to step S81. Furthermore, in step S90, in a case where an instruction to terminate the remote operation control processing has been given, the processing ends.

That is, after a control state has been established, while the controller 31 is kept being rotated at an interval of less than a predetermined time to continuously transmit control commands for adjusting the channel to the television receiver 33, or for a predetermined time with no control command transmitted, a state continues in which the channel can be adjusted by rotating the controller 31 to transmit a control command for controlling the channel to the television receiver 33.

Then, when processing of controlling the channel of the television receiver 33 has not been performed for a predetermined time, the control state is cancelled.

That is, a user can hold the controller 31 and direct the infrared light receiving unit 55 toward the television receiver 33 to be controlled to prompt establishment of a control state. When a control state has been established, the user can recognize establishment of the control state by vibration and sound, and at the same time, recognize the state of the channel of the television receiver 33 at that time.

Moreover, after the control state has been established, a control command for adjusting the channel of the television receiver 33 can be transmitted by simply performing a twisting operation around the axis Ax in FIG. 1 while holding down the tactile switch 54. Then, the channel of the television receiver 33 is adjusted on the basis of the control command. At this time, information indicating the current channel is returned as feedback information from the television receiver 33, and can be recognized by vibration and sound.

Then, after the channel of the television receiver 33 has been changed to a desired channel, the control state is cancelled when a predetermined time has elapsed.

With such a series of natural operations, the television receiver 33 can be remotely operated.

<Remote Operation Control Processing for Lighting Device>

Next, remote operation control processing for the lighting device 34 will be described.

In step S101 (FIG. 13), the control unit 131 controls the infrared light emitting unit 132 to emit an infrared light code indicating the unique ID for identifying itself in a predetermined pattern.

In step S102, the control unit 131 controls the communication unit 133 to determine whether or not a notification of recognition as a control target by the controller 31 and establishment of a control state has been given. In a case where a notification of recognition as a control target and establishment of a control state has not been given, the processing returns to step S101.

That is, until recognition as a control target is made and a control state is established, the lighting device 34 repeats the processing of steps S101 and S102.

On the other hand, in step S43 (FIG. 10), in a case where an infrared code has not been transmitted from the television receiver 33, the processing proceeds to step S54.

In step S54 (FIG. 11), the control unit 71 of the controller 31 controls the infrared light receiving unit 55 to determine whether or not an infrared light code including the ID for identifying the lighting device 34 has been received. For example, in a case where a user holds the controller 31 and directs the infrared light receiving unit 55 toward the lighting device 34 in order to control the lighting device 34 and an infrared light code from the lighting device 34 is thus received, for example, the infrared light code from the lighting device 34 is received in step S54, and the processing proceeds to step S55.

In step S55, the control unit 71 controls the communication unit 74 to notify the lighting device 34 that the lighting device 34 has been recognized as a control target and that a control state has been established via the wireless communication network 35.

By this processing, in step S102 (FIG. 13), a notification indicating that recognition as a control target has been made and that a control state has been established is received, and the processing proceeds to step S103.

In step S103, the control unit 131 controls the communication unit 133 to establish a state of control by the controller 31 via the wireless communication network 35.

In step S104, the control unit 131 makes an inquiry to the illuminance controller 134, reads information regarding a control parameter indicating the current brightness, and controls the communication unit 133 to transmit that information as feedback information to the controller 31.

In step S56 (FIG. 11), the control unit 71 of the controller 31 controls the communication unit 74 to determine whether or not feedback information has been transmitted from the lighting device 34 that is the control target, and similar processing is repeated until feedback information is transmitted. In a case where it is determined in step S56 that feedback information has been transmitted by the processing of step S104, the processing proceeds to step S57.

In step S57, the control unit 71 controls the vibration actuator 53 to, as described with reference to FIG. 4, generate vibration at a time interval and intensity corresponding to a control parameter that corresponds to the current brightness, which is a continuous variable, of the lighting device 34, which is the feedback information received via the communication unit 74. Furthermore, the control unit 71 controls the lighting device 34 to, as described with reference to FIG. 4, generate sound at a time interval and intensity (volume) corresponding to a control parameter that corresponds to the current brightness, which is a continuous variable, of the lighting device 34, which is the feedback information received via the communication unit 74.

That is, by the above processing, simply by directing the infrared light receiving unit 55 toward the lighting device 34 to be controlled, a user can establish a control state, recognize by vibration and sound that the control state has been established, and recognize the current brightness of the lighting device 34.

In step S58, on the basis of detection results of the acceleration sensor 72 and the gyro sensor 73, the control unit 71 determines whether or not, for example, a twisting rotation around the axis Ax in FIG. 1 has been applied to the main body of the controller 31 with the tactile switch 54 held down. In step S58, for example, in a case where it is determined that a twisting rotation around the axis Ax in FIG. 1 has been applied to the main body of the controller 31 with the tactile switch 54 held down, the processing proceeds to step S59.

In step S59, on the basis of the detection results of the acceleration sensor 72 and the gyro sensor 73, the control unit 71 detects the amount of rotation and generates a control parameter in accordance with the amount of rotation. That is, in accordance with the amount of rotation, the control unit 71 generates a control parameter regarding, for example, how much the brightness of the lighting device 34 should be increased or decreased.

In step S60, the control unit 71 generates a control command in accordance with the generated control parameter, and controls the communication unit 74 to transmit the control command to the lighting device 34.

In step S105 (FIG. 13), the control unit 131 of the lighting device 34 controls the communication unit 133 to determine whether or not a control command has been transmitted from the controller 31. In step S105, when the control command is transmitted by the processing of step S60, the processing proceeds to step S106.

In step S106, the control unit 111 controls the illuminance controller 134 to control the brightness of the light emitting unit 135 in accordance with a control parameter corresponding to the control command.

That is, on the basis of the control parameter, the control unit 131 instructs the illuminance controller 134 how much the brightness of light emitted by the light emitting unit 135 should be increased or decreased. On the basis of this instruction, the illuminance controller 134 controls the brightness of the light emitted from the light emitting unit 135. As a result, the brightness of the light emitting unit 135 is adjusted.

In step S107, the control unit 131 makes an inquiry to the illuminance controller 134 to acquire information regarding the current brightness, and controls the communication unit 133 to transmit that information as feedback information to the controller 31.

In step S108, the control unit 131 controls the communication unit 133 to determine whether or not the controller 31 has given a notification of cancellation of recognition as a control target. In a case where a notification of cancellation of recognition as a control target has not been given, the processing returns to step S105.

Furthermore, in a case where a control command has not been transmitted in step S105, the processing of steps S106 and S107 is skipped.

That is, the processes of steps S105 to S108 is repeated until the controller 31 gives a notification of cancellation of recognition as a control target, and the processing of controlling the brightness is repeated each time a control command is transmitted.

In step S61 (FIG. 11), the control unit 71 of the controller 31 controls the communication unit 74 to determine whether or not feedback information has been transmitted from the lighting device 34, and similar processing is repeated until feedback information is transmitted. In step S61, in a case where feedback information has been transmitted by the processing of step S107, the processing proceeds to step S62.

In step S62, the control unit 71 controls the communication unit 74 to receive the transmitted feedback information.

Then, the control unit 71 controls the vibration actuator 53 to, as described with reference to FIG. 4, generate vibration at a time interval and intensity corresponding to a control parameter that corresponds to the current brightness, which is a continuous variable, of the lighting device 34, which is the feedback information received via the communication unit 74. Furthermore, the control unit 71 controls the speaker 52 to, as described with reference to FIG. 4, generate sound at a time interval and intensity (volume) corresponding to a control parameter that corresponds to the current brightness, which is a continuous variable, of the lighting device 34, which is the feedback information received via the communication unit 74.

In step S63, in a case where at least one control command has been transmitted, the control unit 71 determines whether or not the time elapsed since transmission of the last control command is equal to or longer than a predetermined time. In a case where no control command has been transmitted, the control unit 71 determines whether or not the time elapsed since establishment of the control state is equal to or longer than a predetermined time. In step S63, in a case where neither the time elapsed since transmission of the last control command nor the time elapsed since establishment of the control state is equal to or longer than the predetermined time, the processing returns to step S58.

Furthermore, in a case where no rotation of the main body of the controller 31 has been detected in step S58, the processing of steps S59 to S62 is skipped.

Then, in step S63, in a case where at least one control command has been transmitted and the time elapsed since transmission of the last control command is equal to or longer than the predetermined time, or in a case where no control command has been transmitted and the time elapsed since establishment of the control state is equal to or longer than the predetermined time, the processing proceeds to step S64.

In step 64, the control unit 71 controls the communication unit 74 to notify the lighting device 34 of cancellation of recognition as a control target, and cancels the control state.

Accordingly, on the lighting device 34 side, in a case where a notification of cancellation of recognition as a control target has been received in step S108 (FIG. 13), the processing proceeds to step S109.

In step S109, the control unit 131 controls the communication unit 133 to cancel the control state via the wireless communication network 35.

In step S110, the control unit 131 determines whether or not an instruction to terminate the remote operation control processing has been given. In a case where a termination instruction has not been given, the processing returns to step S101. Furthermore, in step S110, in a case where an instruction to terminate the remote operation control processing has been given, the processing ends.

That is, after a control state has been established, while the controller 31 is kept being rotated at an interval of less than a predetermined time to continuously transmit control commands for adjusting the brightness to the lighting device 34, or for a predetermined time with no control command transmitted, a state continues in which the brightness can be adjusted by rotating the controller 31 to transmit a control command for controlling the brightness to the lighting device 34.

Then, when processing of controlling the brightness of the lighting device 34 has not been performed for a predetermined time, the control state is cancelled.

That is, a user can hold the controller 31 and direct the infrared light receiving unit 55 toward the lighting device 34 to be controlled to prompt establishment of a control state. When a control state has been established, the user can recognize establishment of the control state by vibration and sound, and at the same time, recognize the state of the brightness of the lighting device 34 at that time.

Moreover, after the control state has been established, a control command for adjusting the brightness of the lighting device 34 can be transmitted by simply performing a twisting operation around the axis Ax in FIG. 1 while holding down the tactile switch 54. Then, the brightness of the lighting device 34 is adjusted on the basis of the control command. At this time, information indicating the current brightness is returned as feedback information from the lighting device 34, and can be recognized by vibration and sound.

Then, after the brightness of the lighting device 34 has been changed to a desired brightness, the control state is cancelled when a predetermined time has elapsed.

With such a series of natural operations, the lighting device can be remotely operated.

Note that although the above description regarding the television receiver 33 shows an example of a control for changing the channel, it is also possible to enable a control for changing both the channel and the volume by, for example, using different tactile switches.

With the above processing, by using one controller 31, it is possible to prompt establishment of a control state by simply directing the infrared light receiving unit 55 toward a control target device, which is one of the speaker device 32, the television receiver 33, or the lighting device 34. Once a control state has been established, it is possible to recognize establishment of the control state and the state of the volume, channel, and brightness of the control target device.

Furthermore, after the control state has been established, the volume, channel, and brightness can be controlled by applying a twisting rotation around the predetermined axis Ax while holding down the tactile switch 54.

Moreover, after adjustment to a desired volume, channel, and brightness has been made, the establishment of the control state is cancelled when a predetermined time has elapsed.

That is, it is possible to switch between and control a plurality of control target devices with a series of these natural operations.

Furthermore, although the above description shows an example in which one controller 31 is used to switch between and control three types of control target devices, the speaker device 32, the television receiver 33, and the lighting device 34, it is also possible to control other devices in a similar manner.

For example, an air conditioner, a blind, a door, and the like may be controlled in addition to the speaker device 32, the television receiver 33, and the lighting device 34. In this case, continuous variable parameters and discrete variable parameters can be set as the control parameters. The continuous variable parameters are control values that take continuous values, for example, a volume, brightness, and the like. Furthermore, the discrete variable parameters are control values that take discrete values, for example, ON/OFF of a power supply or a function, the channel of the television receiver 33, and the like.

More specifically, as illustrated in FIG. 14, the volume, which is a continuous variable parameter, may be set for the speaker device 32, the channel, which is a discrete variable parameter, and the volume, which is a continuous variable parameter, may be set for the television receiver 33, and the amount of light (brightness), which is a continuous variable parameter, may be set for the lighting device 34. Furthermore, a set temperature and a set air volume as continuous variable parameters may be set for an air conditioner, a light shielding angle as a continuous variable parameter may be set for a blind, and unlock/lock as a discrete variable parameter may be set for a door. Note that the volume, brightness, set temperature, set air volume, light shielding angle, and the like, which are continuous variable parameters, may be treated as discrete variable parameters in a case where the setting values are large/medium/small, high/low, or the like and continuous values cannot be set, in a case where selectable control values are limited, in a case where the control needs to be simplified, or the like.

Furthermore, although the above description shows an example in which a control target device is recognized on the basis of a unique ID recognized by an infrared light code, which is infrared light emitted from the infrared light emitting unit 92, 112, or 132, the control target device may be recognized by means of any directional wireless signal other than infrared light. For example, light other than infrared light (preferably, invisible light) may be used, or a directional electromagnetic wave (so-called wireless), ultrasonic wave, or the like may be used.

2. Second Embodiment

The above description shows an example in which a control state is established by directing the infrared light receiving unit 55 of the controller 31 toward a control target device and the control target device is controlled by rotating the controller 31 around the axis Ax. Alternatively, in a case where the control target device provides content, the content may be made controllable.

Figure 15:
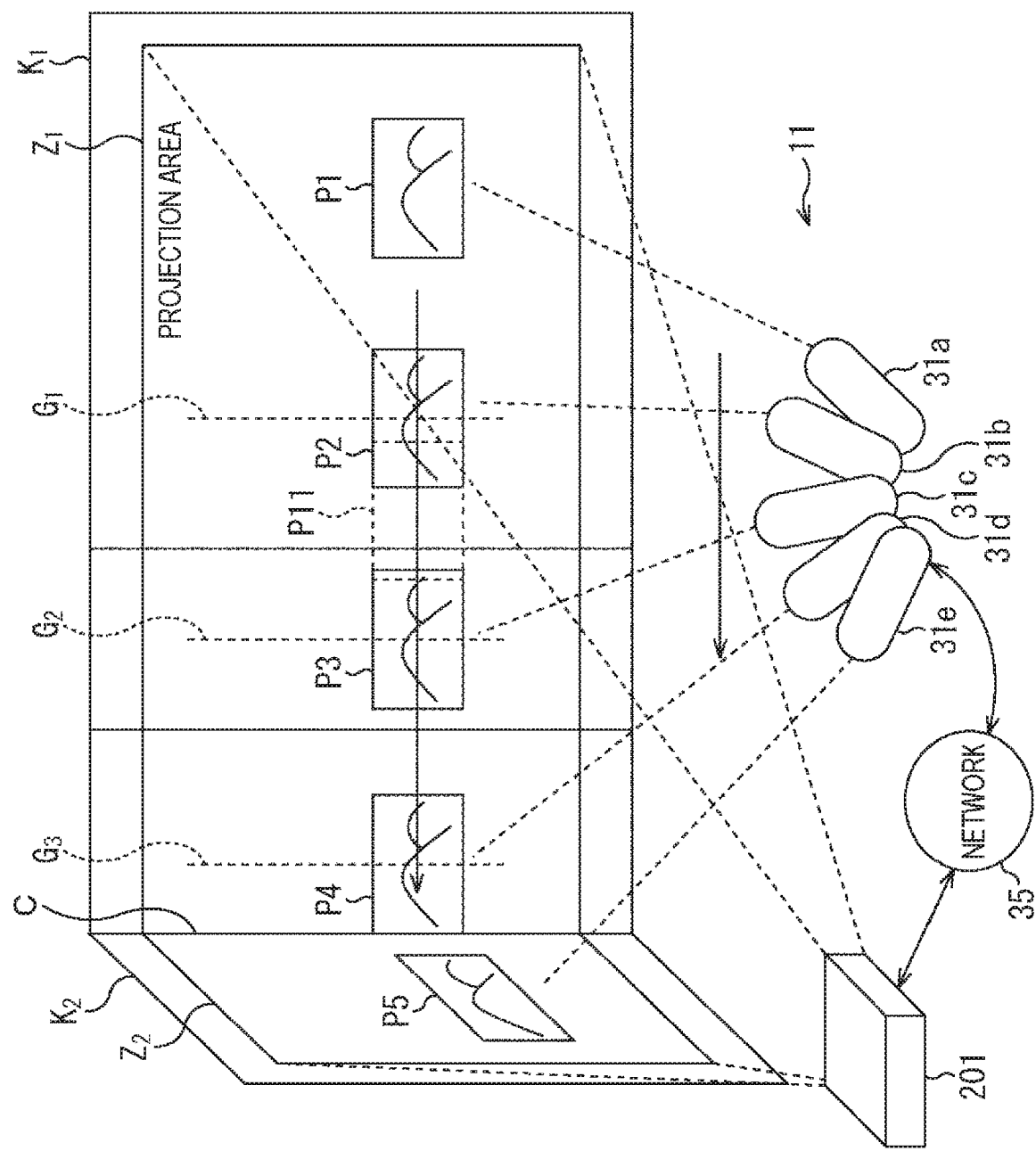
FIG. 15 is a diagram illustrating a control system according to a second embodiment of the present disclosure.

FIG. 15 illustrates a configuration example of a control system according to a second embodiment of the present disclosure.

A control system 11 in FIG. 15 includes a controller 31, a projector device 201, and a wireless communication network 35.

In the control system 11 in FIG. 15, in projection areas Z1 and Z2 projected on wall surfaces K1 and K2 by the projector device 201, content such as a photograph P1 is projected, and the controller 31 is used to select the photograph P1, which is content, and move and project the photograph P1 on the projection areas Z1 and Z2.

The controller 31 in FIG. 15 is additionally provided with a camera near an infrared light receiving unit 55. Pieces of content such as the photograph P1 projected on the wall surfaces K1 and K2 are recognized as images so that which piece of content has been selected can be recognized.

Here, for example, when a user holds the controller 31 and presses a tactile switch 54 with the controller 31 directed at the photograph P1 projected on the projection area Z1, the controller 31 recognizes at that timing that the photograph P1 has been selected on the basis of information in an image captured by the camera, and gives a notification by vibration and sound that the photograph P1, which is content, has been selected.

Then, when the user changes the direction of the controller 31, the photograph P1 being displayed moves on the projection area Z1 in accordance with the change in the direction. For example, when the direction changes as indicated by controllers 31a to 31e illustrated in FIG. 15, the photograph P1 is accordingly projected and displayed so as to sequentially move through photographs P2 to P5.

When the tactile switch 54 is released while the selected content is being moved, the content is deselected, and the photograph, which is content that has been selected, is projected so as to move to and stop at one of grids G1 to G3 that is set at a position closest to the position to which the content has been moved at that time. Here, the grids are positions where a photograph, which is content, can stay, and are set in advance at a predetermined interval on the projection areas Z1 and Z2, which are projection planes of the projector device 201. In FIG. 15, positions indicated by dotted lines are set as the grids G1 to G3.

At this time, for example, when the tactile switch 54 is released at a timing when the photograph P1 is moved to a position indicated by a photograph P11 indicated by a dotted line between the grids G1 and G2 while the photograph P1 is being selected and moved by the controller 31 in the direction of an arrow, the photograph P11 does not remain at the position indicated by the dotted line in the figure, but is attracted and moved to the grid G1 or G2, whichever is closer to the center (or any other position) of the photograph P11, and stays there.

That is, in the case of FIG. 15, the center of the photograph P11 indicated by the dotted line is located between the grids G2 and G3 and is close to the grid G2. When the tactile switch 54 is released at the position of the photograph P11, the photograph P11 is attracted and moved to a position where the center is on the grid G2, and stays there as the photograph P2. At this time, the photograph P11 is displayed so that it looks as if it is attracted and moved to the grid G2, and a sound effect like a sucking sound is emitted from the controller 31.

Furthermore, when the photograph P1 is selected and moved by the controller 31 in the direction of the arrow (to the left in the figure) as illustrated in FIG. 15, bumps and dips on the wall surfaces K1 and K2 are indicated by vibration in accordance with texture of the wall surfaces K1 and K2 on the movement path, and a mimic sound like a clicking sound is generated when the photograph P1 touches a corner C, which is a boundary between the wall surfaces K1 and K2 or when there is a step that is equal to or larger than a predetermined value on the wall surfaces K1 and K2 in order to give an impression as if the selected content is being physically dragged and moved on the wall surfaces K1 and K2.

<Example of Physical Configuration of Controller for Remotely Controlling Content Illustrated in FIG. 15>

Next, an example of a physical configuration of the controller 31 for remotely controlling content as illustrated in FIG. 15 will be described with reference to FIG. 16. Note that, in FIG. 16, configurations having the same functions as those in FIG. 2 are denoted by the same reference numerals, and description thereof will be omitted as appropriate.

Figure 16:
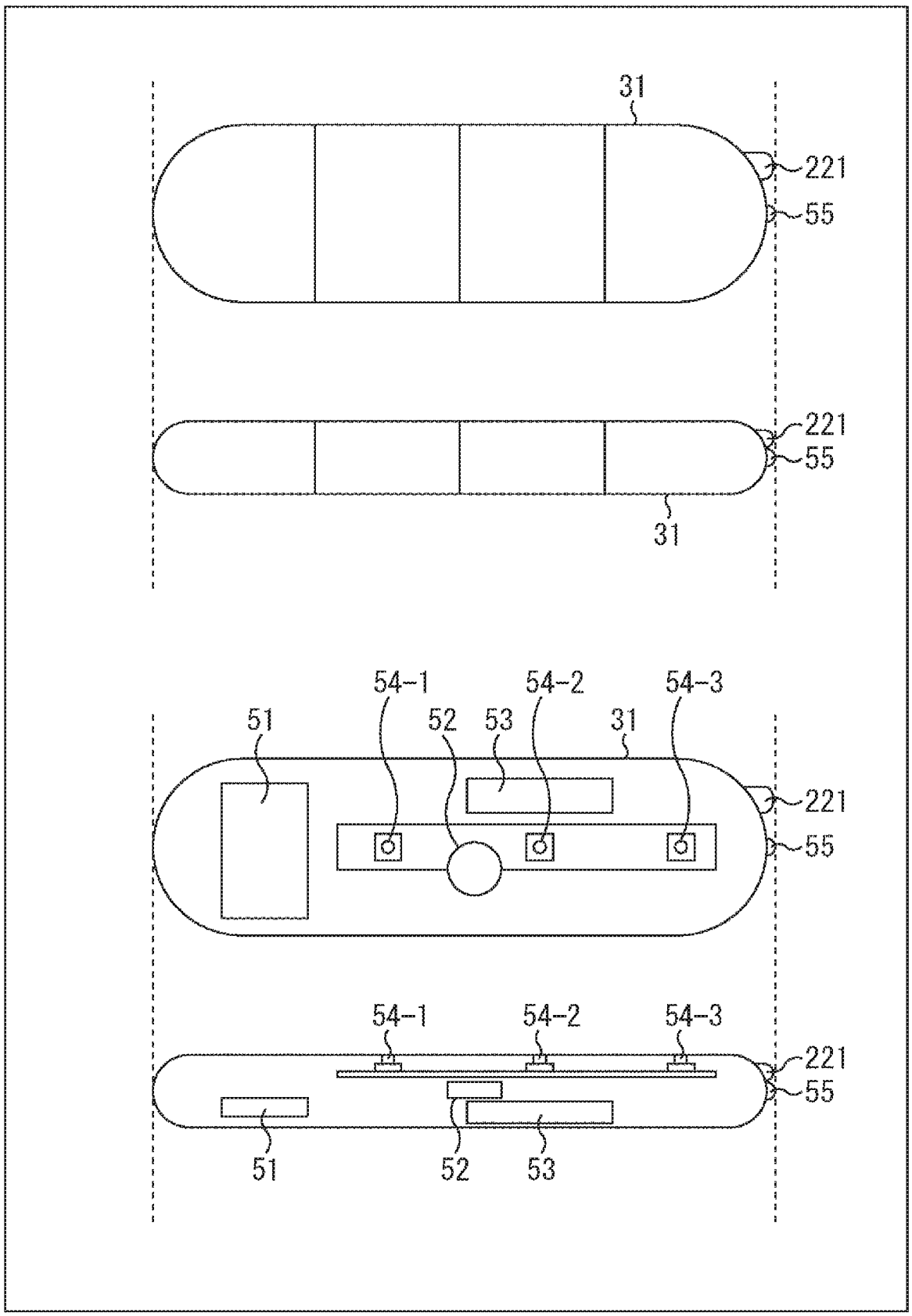
FIG. 16 is a diagram illustrating an example of a physical configuration of a controller in FIG. 15.

That is, the configuration in FIG. 16 differs from the controller 31 in FIG. 2 in that a camera 221 is additionally provided. The camera 221, which is an image sensor including a complementary metal oxide semiconductor (CMOS) or a charge coupled device (CCD), captures an image in substantially the same direction as the infrared light receiving unit 55, and outputs the captured image to a control unit 71.

<Configuration Example of Controller in FIG. 15>

Next, a configuration example of the controller 31 in FIG. 15 will be described in detail with reference to FIG. 16. Note that configurations of the controller 31 in FIG. 16 having the same functions as those of the controller 31 in FIG. 3 are denoted by the same reference numerals, and description thereof will be omitted as appropriate.

Figure 3:
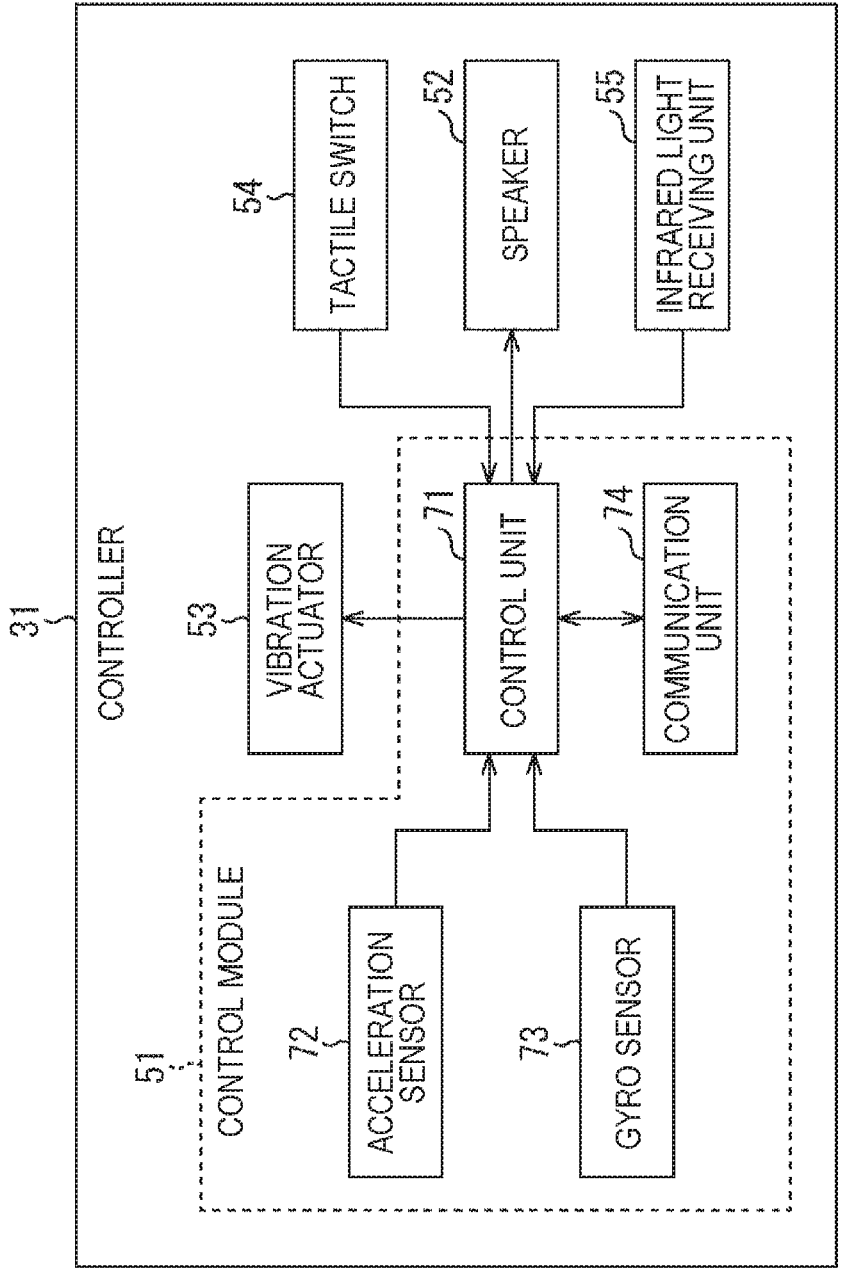
FIG. 3 is a diagram illustrating a configuration example for implementing a function of the controller in FIG. 1.

That is, the controller 31 in FIG. 16 differs from the controller 31 in FIG. 3 in that the camera 221 is provided, and accordingly differs in operation of the control unit 71.

The control unit 71 recognizes that content has been selected on the basis of whether or not there is a photograph as content projected on the projection areas Z1 and Z2 on the wall surfaces K1 and K2, in an image captured by the camera 221 at the timing of holding down of the tactile switch 54. Note that, in a case where a plurality of photographs has been captured by the camera 221, for example, a photograph close to the center of the image may be regarded as being selected.

Furthermore, on the basis of detection results of an acceleration sensor 72 and a gyro sensor 73, the control unit 71 detects a change in the direction indicated by the controller 31 with the tactile switch 54 held down. Then, the control unit 71 generates a control command for moving the selected photograph, which is content, to a position corresponding to the direction indicated by the controller 31, and controls a communication unit 74 to transmit the control command to the projector device 201.

Moreover, the control unit 71 estimates the texture of the wall surfaces K1 and K2 illustrated in FIG. 15 on the basis of an image captured by the camera 221, and controls a vibration actuator 53 to vibrate on the basis of the estimated bumps and dips on the wall surfaces K1 and K2. Furthermore, on the basis of the estimated bumps and dips on the wall surfaces K1 and K2, the control unit 71 controls a speaker 52 to output sound.

<Configuration Example of Projector Device>

Next, a configuration example of the projector device 201 will be described with reference to FIG. 18.

The projector device 201 projects and displays a photograph, which is stored content, on a wall surface. At this time, a control command in accordance with movement of the controller 31 is received, and the position where the photograph is projected is moved.

More specifically, the projector device 201 includes a control unit 241, an infrared light emitting unit 242, a communication unit 243, a projection control unit 244, a projection unit 245, and a storage unit 246.

The control unit 241 includes a processor and the like, and controls the overall operation of the projector device 201. Furthermore, the control unit 241 reads a photograph stored in the storage unit 246 as content, outputs the photograph to the projection control unit 244, and causes the projection unit 245 to project the photograph on, for example, the wall surfaces K1 and K2 in FIG. 15 and the like, and thus the photograph is displayed in the projection areas Z1 and Z2.

The infrared light emitting unit 242 is controlled by the control unit 241, and emits an infrared light code including a unique ID of the projector device 201 in a predetermined pattern.

The communication unit 243 is controlled by the control unit 241, establishes a communication with the controller 31 via the wireless communication network 35 such as Wi-Fi or Bluetooth, receives a control command in accordance with a control parameter, and outputs the control command to the control unit 241.

The projection control unit 244 is controlled by a control unit 91, and controls, in accordance with the input control command, the position of the photograph, which is content, projected in, for example, the projection areas Z1 and Z2, thereby causing the projection unit 245 to project the photograph on a wall surface.

<Example of Reproducing Texture of Wall Surface>

Next, an example will be described in which the texture, which is the bumps and dips on the wall surfaces K1 and K2, is reproduced by vibration and sound.

The control unit 71 estimates the bumps and dips indicating the texture of the wall surfaces K1 and K2 on the basis of an image captured by the camera 221, and controls the vibration actuator 53 and the speaker 52 to reproduce the bumps and dips by vibration and sound.

Figure 19:
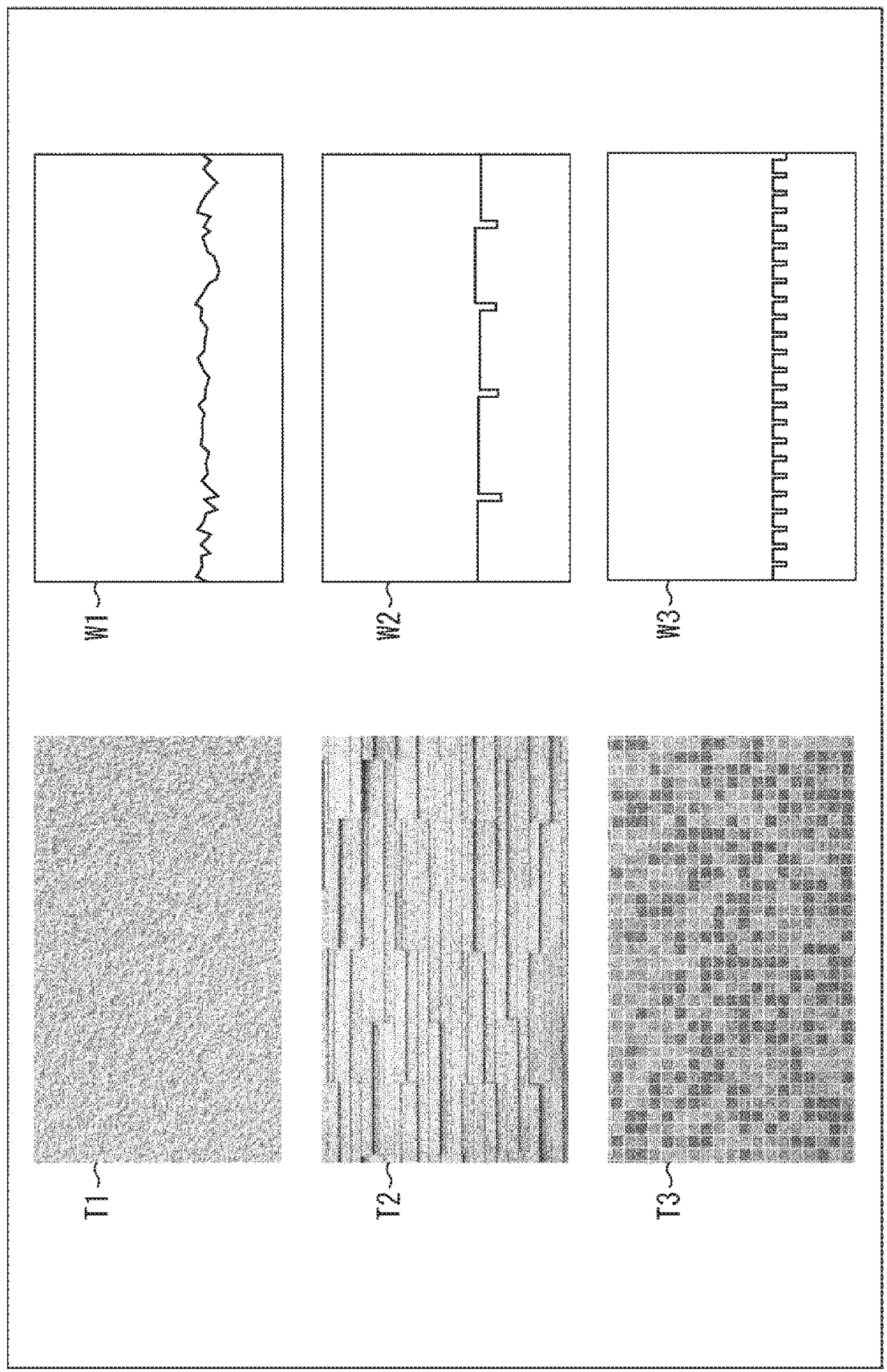
FIG. 19 is a diagram illustrating a function of a grid when content is moved.

More specifically, for example, in a case where an image of a wall surface as indicated by an image T1 in FIG. 19 is captured by the camera 221, when a photograph as content selected by the controller 31 is moved through a path from left to right as indicated by an arrow in the figure, the control unit 71 estimates that the surface in the path is a rough surface having bumps and dips as indicated by a waveform W1 in FIG. 19, for example. Note that, the horizontal axes of the waveforms W1 to W3 in FIG. 19 represent positions to which the photograph is moved in the direction of the arrow across the corresponding images T1 to T3 in FIG. 19, and the vertical axes represent the height of the surface shape at each position.

In this case, the control unit 71 controls the vibration actuator 53 to generate vibration so that a sawtooth waveform as indicated by the waveform W1 may be reproduced. Furthermore, the control unit 71 controls the speaker 52 to generate sound so that a sawtooth waveform as indicated by the waveform W1 may be reproduced.

Furthermore, for example, in a case where an image of a wall surface as indicated by the image T2 in FIG. 19 is captured by the camera 221, when a photograph as content selected by the controller 31 is moved through a path from left to right as indicated by the arrow in the figure, the control unit 71 estimates that the surface in the path is a stepped surface as indicated by the waveform W2 in FIG. 19, for example.

In this case, the control unit 71 controls the vibration actuator 53 to generate a clicking vibration when the content passes over irregularly formed recesses so that a waveform similar to a pulse waveform as indicated by the waveform W2 may be reproduced. Furthermore, the control unit 71 controls the speaker 52 to generate a clicking sound when the content passes over irregularly formed recesses so that a waveform similar to a pulse waveform as indicated by the waveform W2 may be reproduced.

Moreover, for example, in a case where an image of a wall surface as indicated by the image T3 in FIG. 19 is captured by the camera 221, when a photograph as content selected by the controller 31 is moved through a path from left to right as indicated by the arrow in the figure, the control unit 71 estimates that the surface in the path is a stepped surface as indicated by the waveform W3 in FIG. 19, for example.

In this case, the control unit 71 controls the vibration actuator 53 to generate a repeated clicking vibration when the content passes over continuous recesses so that a waveform similar to a short-period pulse waveform as indicated by the waveform W3 may be reproduced. Furthermore, the control unit 71 controls the speaker 52 to generate a repeated clicking sound when the content passes over continuous recesses so that a waveform similar to a short-period pulse waveform as indicated by the waveform W3 may be reproduced.

Note that although this example describes an example in which the control unit 71 estimates the surface shape on the basis of an image captured by the camera 221 and uses a waveform in accordance with the estimation result to generate vibration and sound, a depth sensor may be used instead of the camera 221 to actually measure a distance to a wall surface, measure bumps and dips on the surface, and form a waveform on the basis of the measurement result. Furthermore, distances to the wall surface may be measured and stored in advance by a depth sensor, and the stored measurement results may be used to obtain and use information regarding bumps and dips on the surface.

<Example of Grid>

Next, a grid that defines a position to which a photograph as content is to be moved will be described.

A grid defines a position where the projector device 201 projects a photograph, which is content. For example, FIG. 15 illustrates an example of the grids G1 to G3 set at a predetermined interval in the horizontal direction. By using the grids G1 to G3, for example, in a case of managing a plurality of photographs, which is pieces of content, the photographs stay only at horizontal positions defined by the grids. This allows the photographs to be aligned and arranged in accordance with the positions set as the grids in the horizontal direction, without fine positioning in the horizontal direction, for example.

Note that, although FIG. 15 illustrates an example in which a photograph as content stays so that the center of the photograph may be located on any of the grids G1 to G3, any position other than the center of the photograph, which is content, may also be used as the position in the photograph, which is content, to be aligned with a grid.

Figure 20:
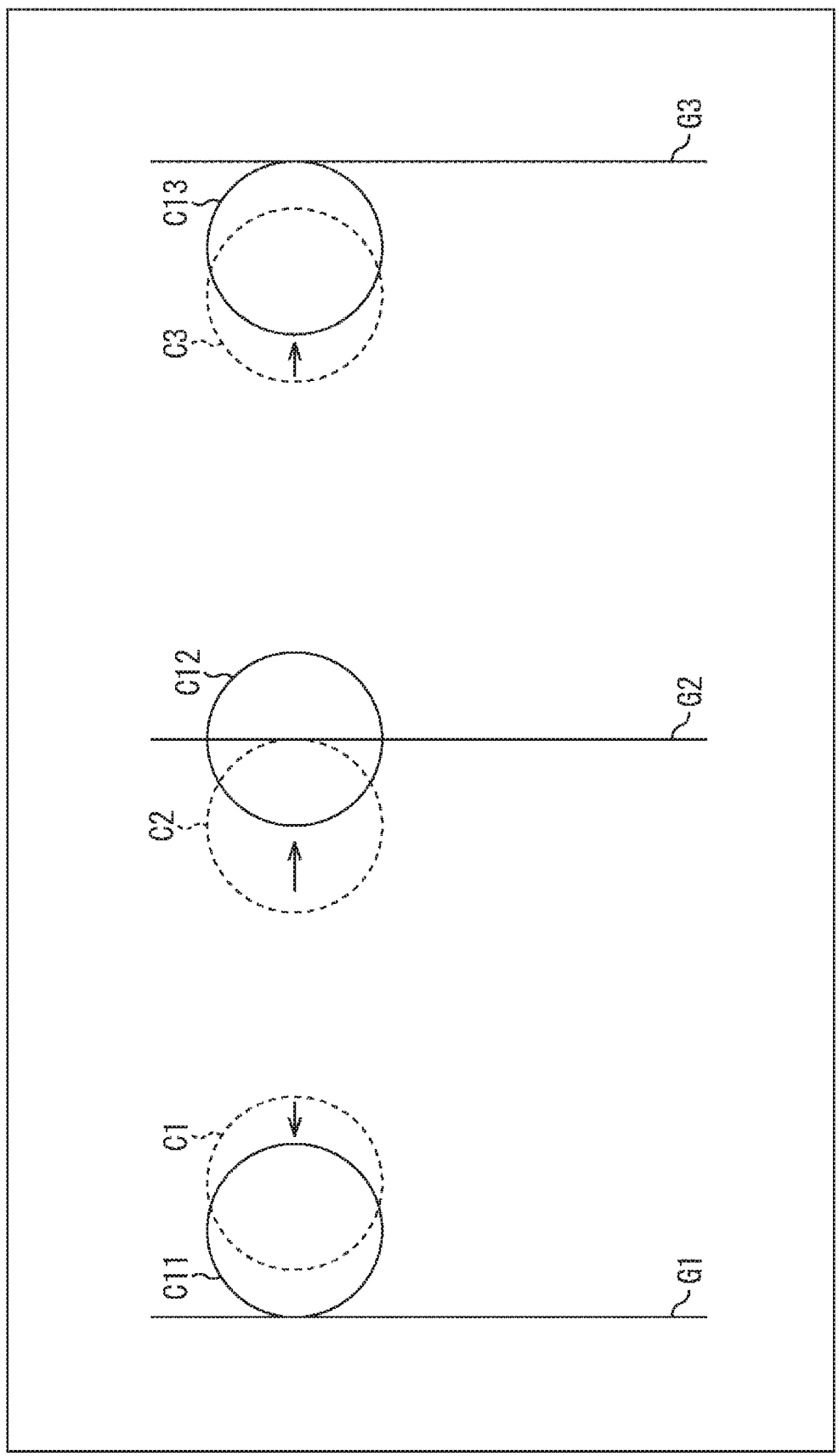
FIG. 20 is a diagram illustrating an example of a texture in an example of a wall surface.

For example, in a case where the content selected by the controller 31 is a mark indicated by a circle illustrated in the left part of FIG. 20, content C11, which is the circle, may stay so that the left edge of the content C11 is in contact with the grid G1.

In this case, for example, when the content, which is the circle, is selected and moved by the controller 31 and then the tactile switch 54 is released at a position of content C1 illustrated in the left part of FIG. 20, the content C1 is moved and projected as if the left edge of the content C1 is attracted to the grid G1, and then stops moving and stays at a position where the left edge is in contact with the grid G1 as indicated by the content C11.

Alternatively, for example, as illustrated in the central part of FIG. 20, content C12, which is a circle, may stay so that the center of the content C12 may be in contact with the grid G2.

In this case, for example, when the content, which is the circle, is selected and moved by the controller 31 and then the tactile switch 54 is released at a position of content C2 illustrated in the central part of FIG. 20, the content C2 is moved and projected as if the center of the content C2 is attracted to the grid G2, and then stops moving and stays at a position where the center is in contact with the grid G2 as indicated by the content C12.

Moreover, for example, as illustrated in the right part of FIG. 20, content C13, which is a circle, may stay so that the right edge of the content C13 may be in contact with the grid G3.

In this case, for example, when the content, which is the circle, is selected and moved by the controller 31 and then the tactile switch 54 is released at a position of content C3 illustrated in the right part of FIG. 20, the content C3 is moved and projected as if the right edge of the content C3 is attracted to the grid G3, and then stops moving and stays at a position where the right edge is in contact with the grid G3 as indicated by the content C13.

Note that, although FIGS. 15 and 20 illustrate examples in which grids are set in the horizontal direction, grids may be set in the vertical direction, or grids may be set in a lattice-like manner in the horizontal and vertical directions.

<Remote Operation Control Processing by Control System in FIG. 15>

Figure 21:
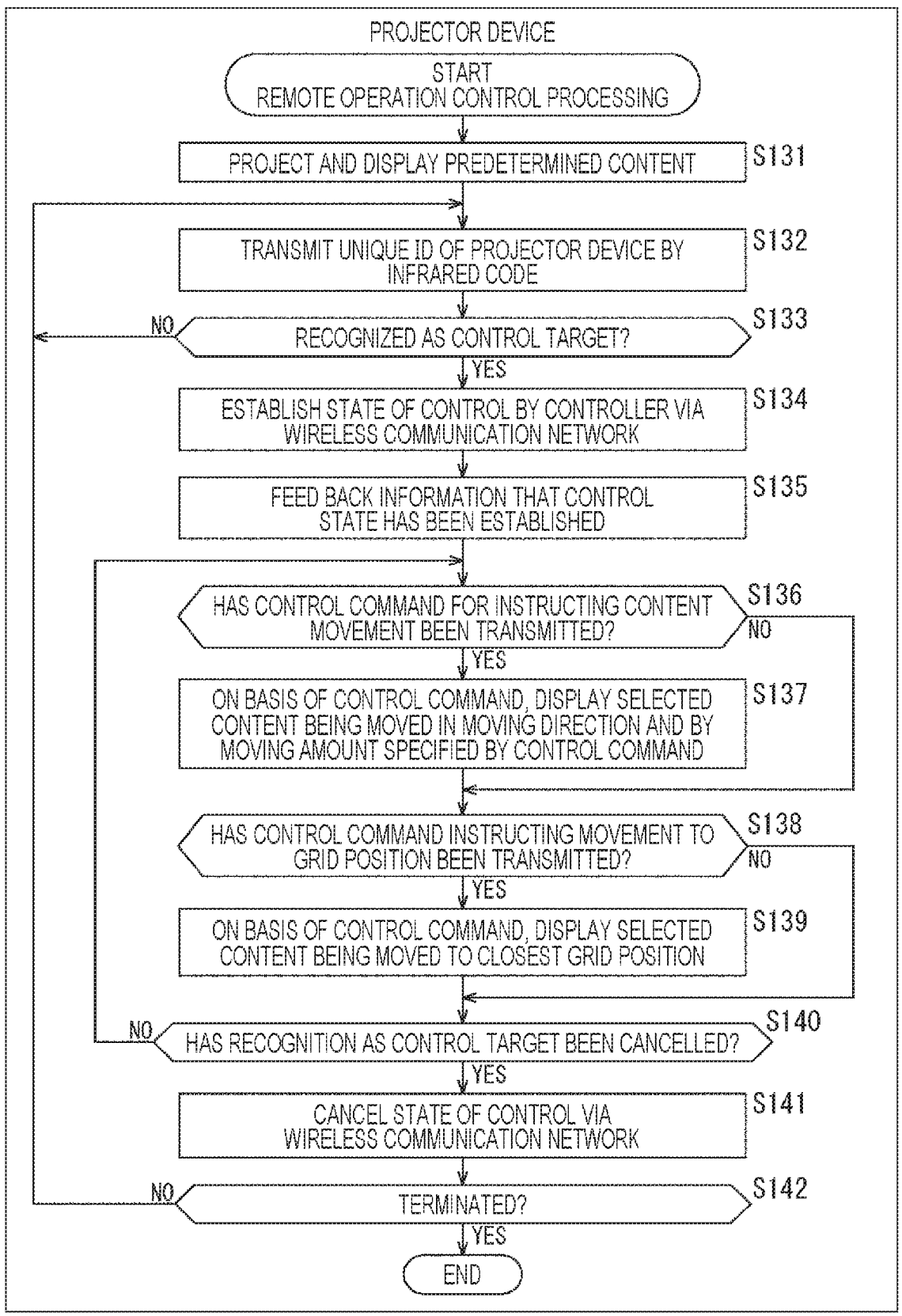
FIG. 21 is a flowchart illustrating remote operation control processing for the projector device in the control system in FIG. 15.
Figure 22:
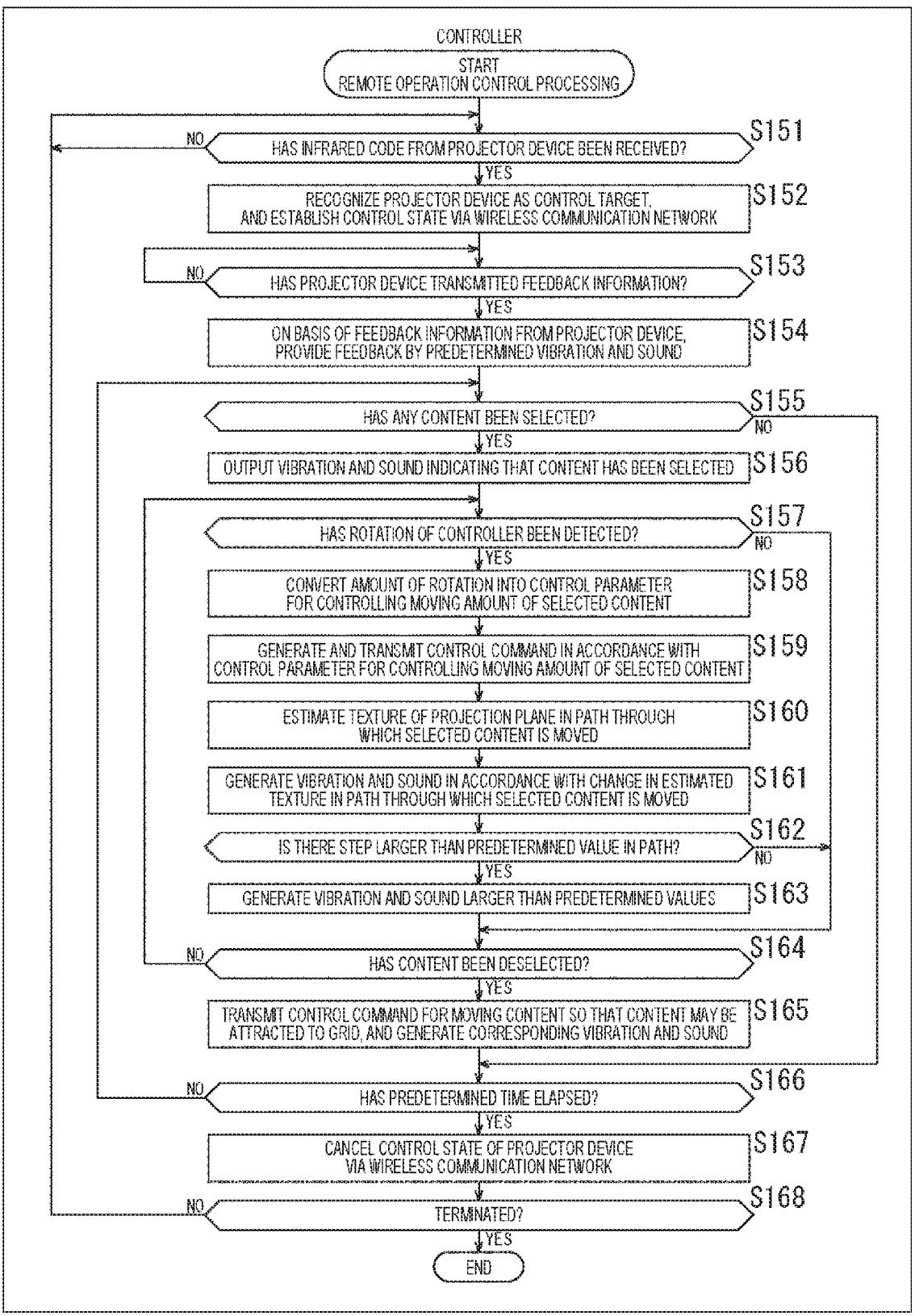
FIG. 22 is a flowchart illustrating remote operation control processing by the controller in the control system of FIG. 15.

Next, remote operation control processing by the control system 11 in FIG. 15 will be described with reference to flowcharts of FIGS. 21 and 22.

In step S131 (FIG. 21), the control unit 241 of the projector device 201 reads data of a photograph stored in the storage unit 246 as content, and outputs the photograph to the projection control unit 244. The projection control unit 244 controls the projection unit 245 to project the supplied photograph as content in, for example, the projection areas Z1 and Z2 on the wall surfaces K1 and K2 in FIG. 15.

In step S132, the control unit 241 of the projector device 201 controls the infrared light emitting unit 242 to emit an infrared light code indicating the unique ID for identifying itself in a predetermined pattern.

In step S133, the control unit 241 controls the communication unit 243 to determine whether or not a notification of recognition as a control target by the controller 31 and establishment of a control state has been given. In a case where a notification of recognition as a control target and establishment of a control state has not been given, the processing returns to step S132.

That is, until recognition as a control target is made and a control state is established, the projector device 201 repeats the processing of steps S132 and S133.

On the other hand, in step S151 (FIG. 22), the control unit 71 of the controller 31 controls the infrared light receiving unit 55 to determine whether or not an infrared light code including the ID for identifying the projector device 201 has been received. For example, in a case where a user holds the controller 31 and directs the infrared light receiving unit 55 toward the projector device 201 in order to control the projector device 201 and an infrared light code from the projector device 201 is thus received, for example, the infrared light code from the projector device 201 is received in step S151, and the processing proceeds to step S152.

In step S152, the control unit 71 controls the communication unit 74 to notify the projector device 201 that the projector device 201 has been recognized as a control target and that a control state has been established via the wireless communication network 35.

By this processing, in step S133 (FIG. 21), a notification indicating that recognition as a control target has been made and that a control state has been established is received, and the processing proceeds to step S134.

In step S134, the control unit 241 controls the communication unit 243 to establish a state of control by the controller 31 via the wireless communication network 35.

In step S135, the control unit 241 controls a communication unit 93 to transmit, to the controller 31, information indicating that the control state has been established, as feedback information.

In step S153 (FIG. 22), the control unit 71 of the controller 31 controls the communication unit 74 to determine whether or not feedback information has been transmitted from the projector device 201 that is the control target, and similar processing is repeated until feedback information is transmitted. In a case where it is determined in step S153 that feedback information has been transmitted by the processing of step S135, the processing proceeds to step S154.

In step S154, the control unit 71 controls the vibration actuator 53 to generate vibration at a predetermined intensity indicating that the current control state of the projector device 201 has been established, which is the feedback information received via the communication unit 74. Furthermore, the control unit 71 controls the speaker 52 to generate sound at a predetermined intensity (volume) indicating that the current control state of the projector device 201 has been established, which is the feedback information received via the communication unit 74.

That is, by the above processing, simply by directing the infrared light receiving unit 55 toward the projector device 201 to be controlled, a user can establish a control state, and recognize by vibration and sound that the control state has been established.

In step S155, the control unit 71 determines whether or not content has been selected on the basis of whether or not the tactile switch 54 is held down with a photograph, which is content, located near the center of an image captured by the camera 221.

In a case where it is determined in step S155 that any piece of content has been selected, the processing proceeds to step S156. Note that, in a case where it is determined that content has been selected, the control unit 71 detects, on the basis of the image captured by the camera 221, the position in the projection areas Z1 and Z2 where the selected content is projected by the projector device 201.

In step S156, the control unit 71 controls the vibration actuator 53 to generate vibration at an intensity indicating that content has been selected. Furthermore, the control unit 71 controls the speaker 52 to generate sound at an intensity (volume) indicating that content has been selected.

In step S157, on the basis of detection results of the acceleration sensor 72 and the gyro sensor 73, the control unit 71 determines whether or not an instruction to move the position where the content is projected has been given by applying a rotation so as to change the directions of the infrared light receiving unit 55 and the camera 221 as indicated by the controllers 31a to 31e illustrated in FIG. 15. In step S157, for example, in a case where it is determined that an operation for moving the content has been performed by applying a rotation so as to change the direction of the main body of the controller 31 with the content selected, the processing proceeds to step S158.

In step S158, on the basis of the detection results of the acceleration sensor 72 and the gyro sensor 73, the control unit 71 detects the amount of rotation and generates a control parameter in accordance with the amount of rotation. That is, the control unit 71 generates, in accordance with the amount of rotation, a control parameter for instructing a movement of the content, which includes a moving direction and a moving amount of the content.

In step S159, the control unit 71 generates a control command in accordance with the generated control parameter, and controls the communication unit 74 to transmit, to the projector device 201, the control command together with content specifying information for specifying which content is being selected and at which position the content is currently located in the projection areas Z1 and Z2 of the projector device 201.

In step S136 (FIG. 21), the control unit 241 of the projector device 201 controls the communication unit 243 to determine whether or not a control command for instructing content movement has been transmitted from the controller 31. In step S136, when the control command is transmitted by the processing of step S159, the processing proceeds to step S137.

In step S137, the control unit 241 supplies the content specifying information and the control command to the projection control unit 244. On the basis of the content specifying information and the control command, the projection control unit 244 controls the projection unit 245 to project a photograph, which is the selected content, in the projection areas Z1 and Z2 so that the photograph may be moved in the moving direction and by the moving amount that are specified by the control command.

Note that, in a case where no control command for instructing content movement has been transmitted in step S136, the processing of step S137 is skipped.

That is, by the above processing, content to be controlled can be specified by holding down the tactile switch 54 with an imaging direction of the camera 221 of the controller 31 turned toward the photograph as content to be selected. Moreover, the position the content is displayed can be moved by changing the imaging direction of the camera 221 to the direction to which the content to be controlled is to be moved.

On the other hand, in step S160 (FIG. 22), the control unit 71 estimates a texture of a projection plane in the path through which the content is moved on the basis of the image captured by the camera 221.

In step S161, as described with reference to FIG. 19, the control unit 71 controls the vibration actuator 53 to generate vibration at an intensity based on the estimated texture. Furthermore, as described with reference to FIG. 19, the control unit 71 controls the speaker 52 to generate sound at an intensity (volume) based on the estimated texture.

In step S162, on the basis of the estimated texture, the control unit 71 determines whether or not there is a step larger than a predetermined value in the path of the selected photograph as content. In a case where it is determined in step S162 that there is a step larger than the predetermined value, the processing proceeds to step S163.

In step S163, at a timing at which the selected content passes over the step, the control unit 71 controls the vibration actuator 53 to generate vibration at an intensity greater than a predetermined intensity that allows for recognition that the selected content has just passed over the step. Furthermore, the control unit 71 controls the speaker 52 to generate sound such as a "clicking" sound louder than a predetermined volume that allows for recognition that the selected content has just passed over the step.

That is, for example, when the photograph P1 as content illustrated in FIG. 15 is selected, moved in the direction of the arrow, and sequentially moved as indicated by the photographs P2 to P4, vibration and sound can be generated in accordance with the texture of the projection area Z1 in the path to provide a feeling that the selected content is being dragged and moved on the projection area Z1.

Furthermore, at a timing when the selected content that continues to be moved moves to a position where it touches the corner C where the projection areas Z1 and Z2 intersect, vibration and sound can be generated to provide a user a feeling that the selected content has just bumped against the corner C.

In any case, it is possible to provide a feeling of dragging and moving, on the wall surfaces K1 and K2, the photograph as content projected by the projector device 201 as if the photograph as content were physically present.

Note that, in a case where it is determined in step S162 that there is no step larger than the predetermined value in the path of the photograph as content, the processing of step S163 is skipped.

In step S164, the control unit 71 determines whether or not the tactile switch 54 has been released to deselect the content. In a case where it is determined in step S164 that the content has not been deselected, the processing returns to step S157.

Furthermore, in a case where no rotation of the main body of the controller 31 has been detected in step S157, the processing of steps S158 to S162 is skipped.

That is, until the content is deselected, the processing of steps S157 to S164 is repeated so that the content can be moved, and the processing of outputting vibration and sound in accordance with the texture in the path is repeated.

Then, in step S164, in a case where the tactile switch 54 has been released to deselect the content, the processing proceeds to step S165.

In step S165, the control unit 71 generates a control command for moving the content so that the content may be attracted to the closest grid in accordance with the position to which the content has been moved, and controls the communication unit 74 to transmit the control command together with the content specifying information to the projector device 201.

At this time, the control unit 71 controls the vibration actuator 53 to generate vibration that provides a feeling of a movement of the content being attracted to a grid position. Furthermore, the control unit 71 controls the speaker 52 to generate sound that gives an impression that the content is being attracted to the grid position.

In step S138 (FIG. 21), the control unit 241 controls the communication unit 243 to determine whether or not a control command has been transmitted to move the content so that the content may be attracted to the closest grid in accordance with the position to which the content has been moved.

In step S138, in a case where the control command has been transmitted to move the content so that the content may be attracted to the grid, the processing proceeds to step S139.

In step S139, the control unit 241 supplies the projection control unit 244 with the control command for moving the content so that the content may be attracted to the grid and the content specifying information. The projection control unit 244 controls the projection unit 245 to project and display, on the basis of the control command and the content specifying information, content specified by the content specifying information so that the content may be moved to the closest grid from the current position as described with reference to FIG. 20.

Note that, in step S138, in a case where the control command for moving the content so that the content may be attracted to the grid has not been transmitted, the processing of step S139 is skipped.

In step S140, the control unit 241 controls the communication unit 243 to determine whether or not the controller 31 has given a notification of cancellation of recognition as a control target. In a case where a notification of cancellation of recognition as a control target has not been given, the processing returns to step S136.

That is, until the controller 31 gives a notification of cancellation of recognition as a control target, the processing of steps S136 to S140 is repeated, and each time a control command for instructing content movement or a control command for moving the content to the closest grid from the current position is transmitted, the processing of moving and projecting the content is repeated.

In step S166, in a case where at least one control command has been transmitted, the control unit 71 determines whether or not the time elapsed since transmission of the last control command is equal to or longer than a predetermined time. In a case where no control command has been transmitted, the control unit 71 determines whether or not the time elapsed since establishment of the control state is equal to or longer than a predetermined time. In step S166, in a case where neither the time elapsed since transmission of the last control command nor the time elapsed since establishment of the control state is equal to or longer than the predetermined time, the processing returns to step S155.

Then, in step S166, in a case where the time elapsed since transmission of the last control command is equal to or longer than the predetermined time, or in a case where no control command has been transmitted and the time elapsed since establishment of the control state is equal to or longer than the predetermined time, the processing proceeds to step S167.

In step 167, the control unit 71 controls the communication unit 74 to notify the projector device 201 of cancellation of recognition as a control target, and cancels the control state.

In step S168, the control unit 71 determines whether or not an instruction to terminate the remote operation control processing has been given. In a case where a termination instruction has not been given, the processing returns to step S151. Furthermore, in step S168, in a case where an instruction to terminate the remote operation control processing has been given, the processing ends.

Accordingly, on the projector device 201 side, in a case where a notification of cancellation of recognition as a control target has been received in step S140 (FIG. 21), the processing proceeds to step S141.

In step S141, the control unit 241 controls the communication unit 243 to cancel the control state via the wireless communication network 35.

In step S142, the control unit 91 determines whether or not an instruction to terminate the remote operation control processing has been given. In a case where a termination instruction has not been given, the processing returns to step S132. Furthermore, in step S142, in a case where an instruction to terminate the remote operation control processing has been given, the processing ends.

That is, after a control state has been established, while the controller 31 is kept being rotated at an interval of less than a predetermined time to continuously transmit control commands for selecting and moving content in the projection areas Z1 and Z2 where the content is projected by the projector device 201, or for a predetermined time with no control command transmitted, a state continues in which the content can be moved by rotating the controller 31 and transmitting a control command for controlling content movement.

Then, when processing of controlling movement of content projected by the projector device 201 has not been performed for a predetermined time, the control state is cancelled.

That is, a user can select content to be controlled by holding the controller 31, directing the camera 221 at the content to be controlled, and holding down the tactile switch 54.

Furthermore, when the content has been selected, a control command for instructing a moving direction and a moving amount can be transmitted by rotating the imaging direction of the camera 221 of the controller 31 to a direction to which the content is to be moved while holding down the tactile switch 54, and movement of the content is controlled on the basis of the control command. At this time, the texture of the wall surface in the path through which the content is moved is estimated, and vibration and sound are generated in accordance with the texture. This allows for providing a feeling of dragging and moving a photograph as content that is merely projected on the wall surface as if it were a photograph that is physically present.

Then, after the photograph as content has been moved to a desired position, the control state is cancelled when a predetermined time has elapsed.

With such a series of natural operations, a photograph as content projected by the projector device 201 can be remotely operated with a feeling that a physically real photograph is being dragged and moved on the wall surface.

3. Modified Example

The above description shows a working example in a case where a control target device to be controlled by the controller 31 is provided with a dedicated configuration such as an infrared light emitting unit. For this reason, control target devices that can be controlled by the controller 31 have been limited to devices having a dedicated configuration such as an infrared light emitting unit.

For this reason, a device that is not provided with a dedicated configuration may also be treated as a control target device by connecting the device, via an external terminal such as a USB terminal, for example, with an additional device having a configuration such as an infrared light emitting unit required for control by the controller 31.

Figure 23:
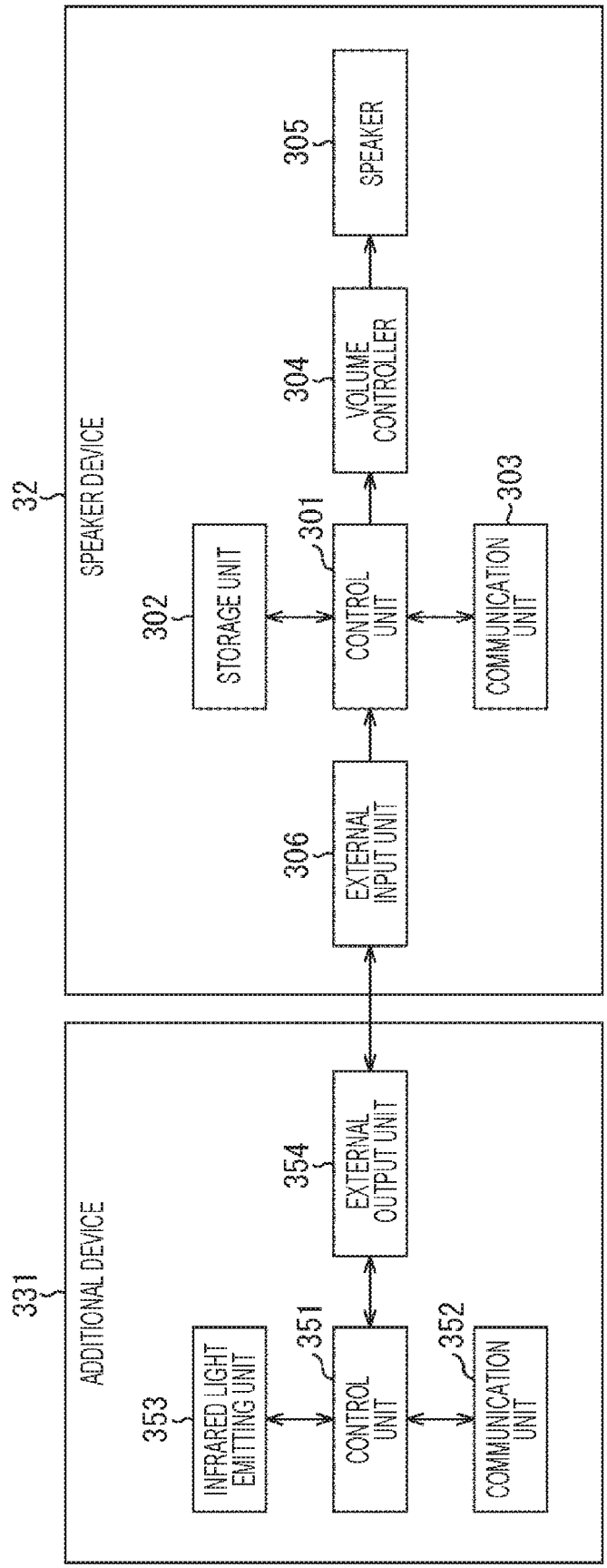
FIG. 23 is a diagram illustrating a configuration example for implementing a function of a speaker device in a case where an additional device is connected.

FIG. 23 illustrates a configuration in a case where an additional device 331 including an infrared light emitting unit is additionally connected to a speaker device 32 that is not provided with an infrared light emitting unit required for control by the controller 31.

The speaker device 32 in FIG. 23 includes a control unit 301, a storage unit 302, a communication unit 303, a volume controller 304, a speaker 305, and an external input unit 306. Note that the communication unit 303, the volume controller 304, and the speaker 305 are similar to the communication unit 93, the volume controller 94, and the speaker 95 in FIG. 5, and description thereof will be omitted.

The control unit 301 implements a function substantially similar to that of the control unit 91 when the additional device 331 is connected via the external input unit 306 including a universal serial bus (USB) terminal and the like.

Furthermore, the additional device 331 includes a control unit 351, a storage unit 352, an infrared light emitting unit 353, and an external output unit 354.

The control unit 351 controls the overall operation of the additional device 331.

The storage unit 352 stores a driver and a program required for control by the controller 31.

The external output unit 354 includes, for example, a USB terminal and the like, and is connected with the external input unit 306 of the speaker device 32.

That is, when the external output unit 354 of the additional device 331 and the external input unit 306 of the speaker device 32 are connected, the control unit 351 supplies the driver and the program stored in the storage unit 352 to the speaker device 32.

The control unit 301 acquires the driver and the program supplied from the additional device 331, and stores the driver and the program in the storage unit 302. Then, the control unit 301 implements a function similar to that of the control unit 91 by executing the driver and the program stored in the storage unit 302. At this time, the control unit 301 supplies an ID for identifying itself to the control unit 351 of the additional device 331.

The control unit 351 causes the storage unit 352 to store the ID for identifying the connected speaker device 32. Then, the control unit 351 generates an infrared light code on the basis of the ID for identifying the speaker device 32 stored in the storage unit 352, and causes the infrared light emitting unit 353 to emit the infrared light code.

With the above-described configuration, remote operation control processing by the controller 31 may be implemented even on a device like the speaker device 32 in the right part of FIG. 23 that does not include an infrared light emitting unit or the like.

Note that, although FIG. 23 illustrates an example of the speaker device 32, any other device may be used as long as the device includes the external input unit 306. Examples of such a device include a television receiver 33, a lighting device 34, the projector device 201, and the like that do not have a configuration such as an infrared light emitting unit required for control by the controller 31.

Furthermore, the above description shows examples in which a control target device such as the speaker 32, the television receiver 33, or the lighting device 34 constantly transmits a directional wireless signal including an infrared light code, as represented by infrared light, for identifying itself, and is recognized as a control target when the direction of the controller 31, which is a control device, is adjusted so that the wireless signal may be received, and thus a control state is established.

However, a control state may also be established by the controller 31, which is a control device, transmitting a directional wireless signal such as an infrared light code for identifying itself to the control target device, and the control target device receiving the wireless signal from the controller 31 and transmitting a directional wireless signal including an infrared light code for identifying itself to the controller 31.

In this case, the controller 31 is further provided with a directional wireless signal transmitting unit that transmits a directional wireless signal such as infrared light, and transmits a wireless signal when, for example, any one of the tactile switches 54-1 to 54-3 is operated. Furthermore, the control target device is further provided with a directional wireless signal receiving unit that receives a directional wireless signal such as infrared light, and, for example, the infrared light emitting unit 92, 112, 132, 242, or 353 emits light in a predetermined pattern including an infrared light code when a wireless signal including infrared light from the controller 31 is received.

4. Example of Execution by Software

Incidentally, the series of pieces of processing described above can be executed not only by hardware but also by software. In a case where the series of pieces of processing is executed by software, a program constituting the software is installed from a recording medium into a computer built into dedicated hardware, a general-purpose personal computer capable of executing various functions with various programs installed therein, for example, or the like.

Figure 24:
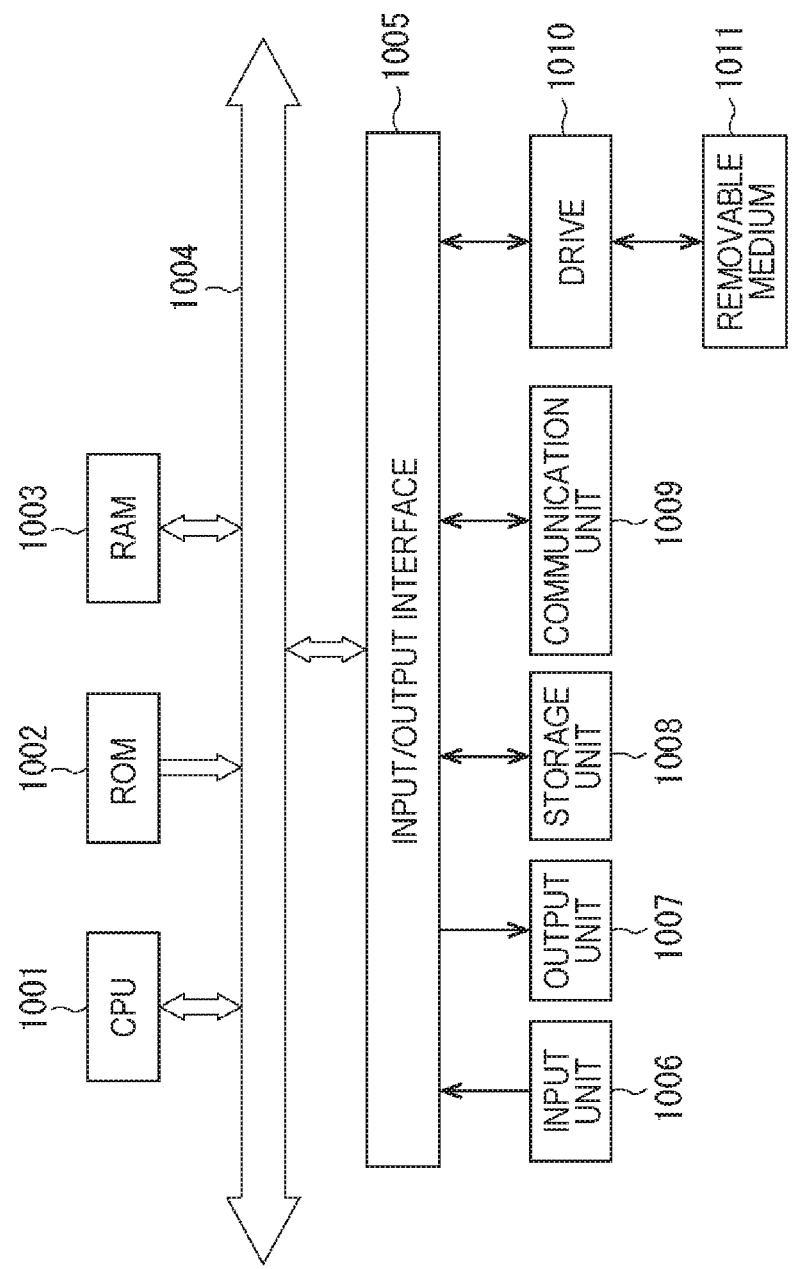
FIG. 24 is a diagram illustrating a configuration example of a general-purpose personal computer.

FIG. 24 illustrates a configuration example of a general-purpose personal computer. This personal computer has a built-in central processing unit (CPU) 1001. The CPU 1001 is connected with an input/output interface 1005 via a bus 1004. The bus 1004 is connected with a read only memory (ROM) 1002 and a random access memory (RAM) 1003.

The input/output interface 1005 is connected with an input unit 1006, an output unit 1007, a storage unit 1008, and a communication unit 1009. The input unit 1006 includes an input device such as a keyboard and a mouse used by a user to input an operation command. The output unit 1007 outputs a processing operation screen and an image of a processing result to a display device. The storage unit 1008 includes a hard disc drive or the like for storing programs and various types of data. The communication unit 1009 includes a local area network (LAN) adapter or the like and executes communication processing via a network as represented by the Internet. Furthermore, the input/output interface 1005 is connected with a drive 1010 that reads and writes data from and to a removable medium 1011 such as a magnetic disc (including a flexible disc), an optical disc (including a compact disc-read only memory (CD-ROM) and a digital versatile disc (DVD)), a magneto-optical disc (including Mini Disc (MD)), or a semiconductor memory.

The CPU 1001 executes various types of processing according to a program stored in the ROM 1002 or a program that is read from the removable medium 1011 such as a magnetic disc, an optical disc, a magneto-optical disc, or a semiconductor memory, installed in the storage unit 1008, and loaded from the storage unit 1008 into the RAM 1003. The RAM 1003 also stores, as appropriate, data or the like necessary for the CPU 1001 to execute various types of processing.

To perform the series of pieces of processing described above, the computer configured as described above causes the CPU 1001 to, for example, load a program stored in the storage unit 1008 into the RAM 1003 via the input/output interface 1005 and the bus 1004 and then execute the program.

The program to be executed by the computer (CPU 1001) can be provided by, for example, being recorded on the removable medium 1011 as a package medium or the like. Furthermore, the program can be provided via a wired or wireless transmission medium such as a local area network, the Internet, or digital satellite broadcasting.

Inserting the removable medium 1011 into the drive 1010 allows the computer to install the program into the storage unit 1008 via the input/output interface 1005. Furthermore, the program can be received by the communication unit 1009 via a wired or wireless transmission medium and installed into the storage unit 1008. In addition, the program can be installed in advance in the ROM 1002 or the storage unit 1008.

Note that the program to be executed by the computer may be a program that performs the pieces of processing in chronological order as described in the present specification, or may be a program that performs the pieces of processing in parallel or when needed, for example, when the processing is called.

Figure 5:
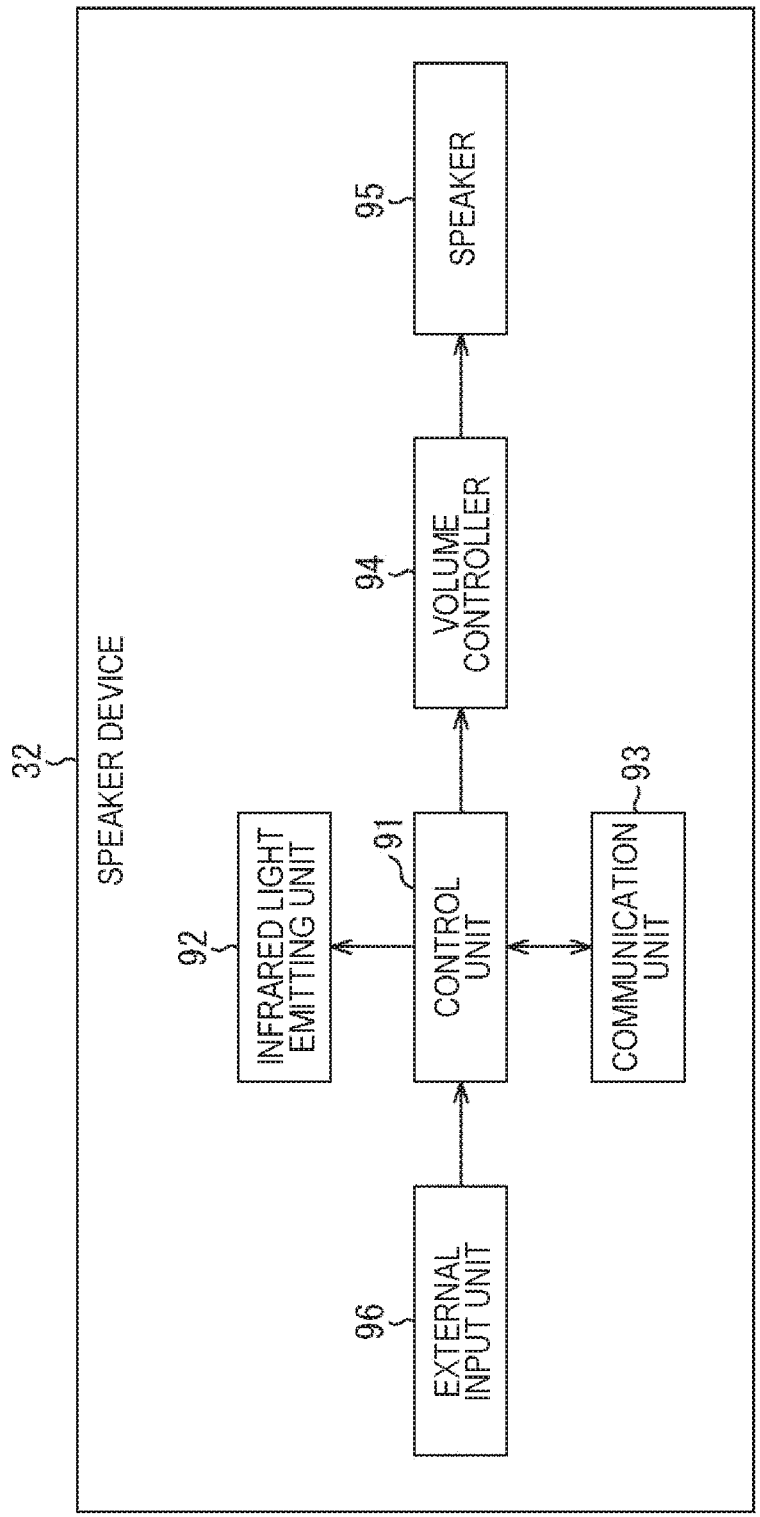
FIG. 5 is a diagram illustrating a configuration example for implementing a function of a speaker device.
Figure 6:
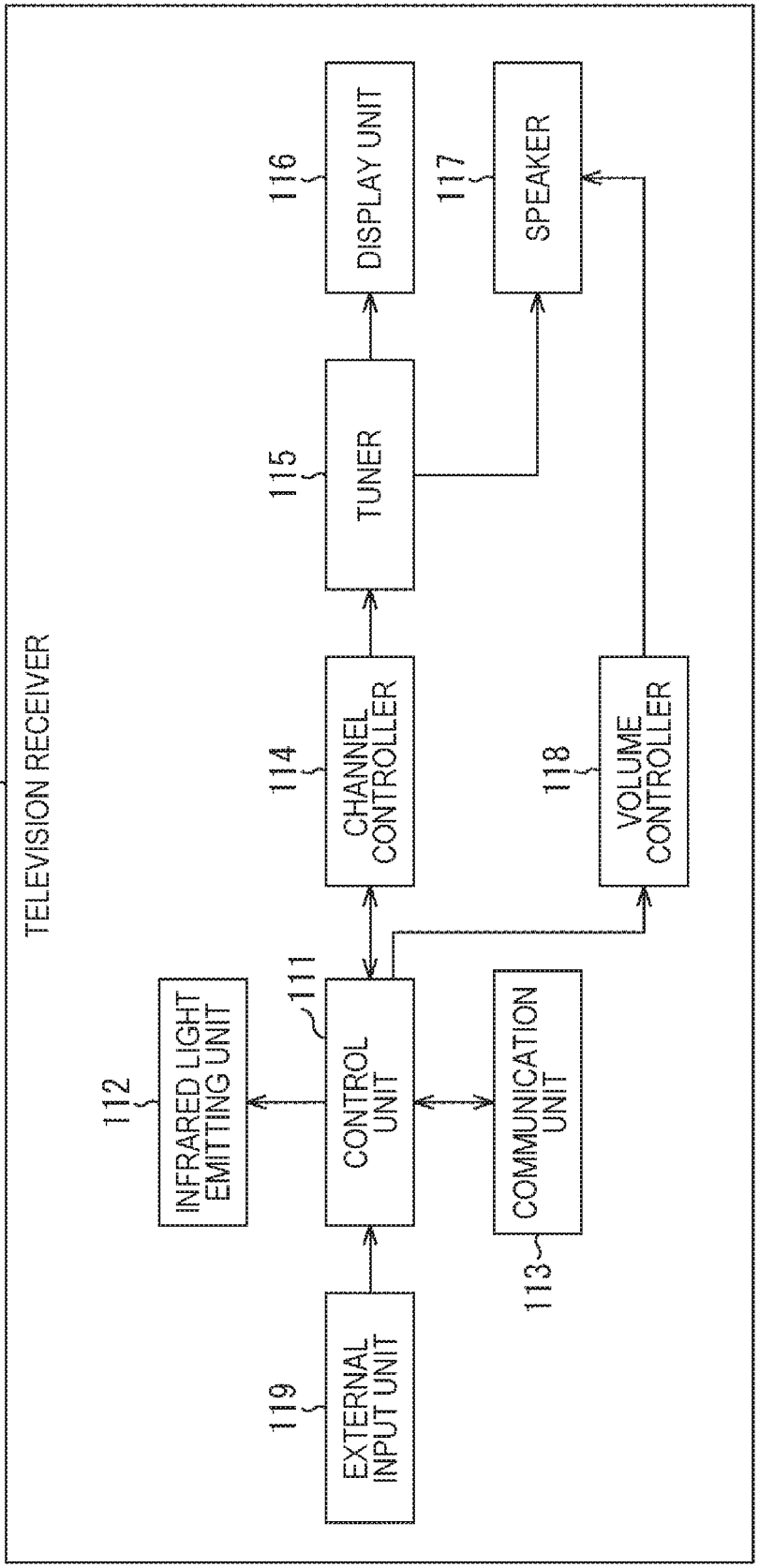
FIG. 6 is a diagram illustrating a configuration example for implementing a function of a television receiver.
Figure 7:
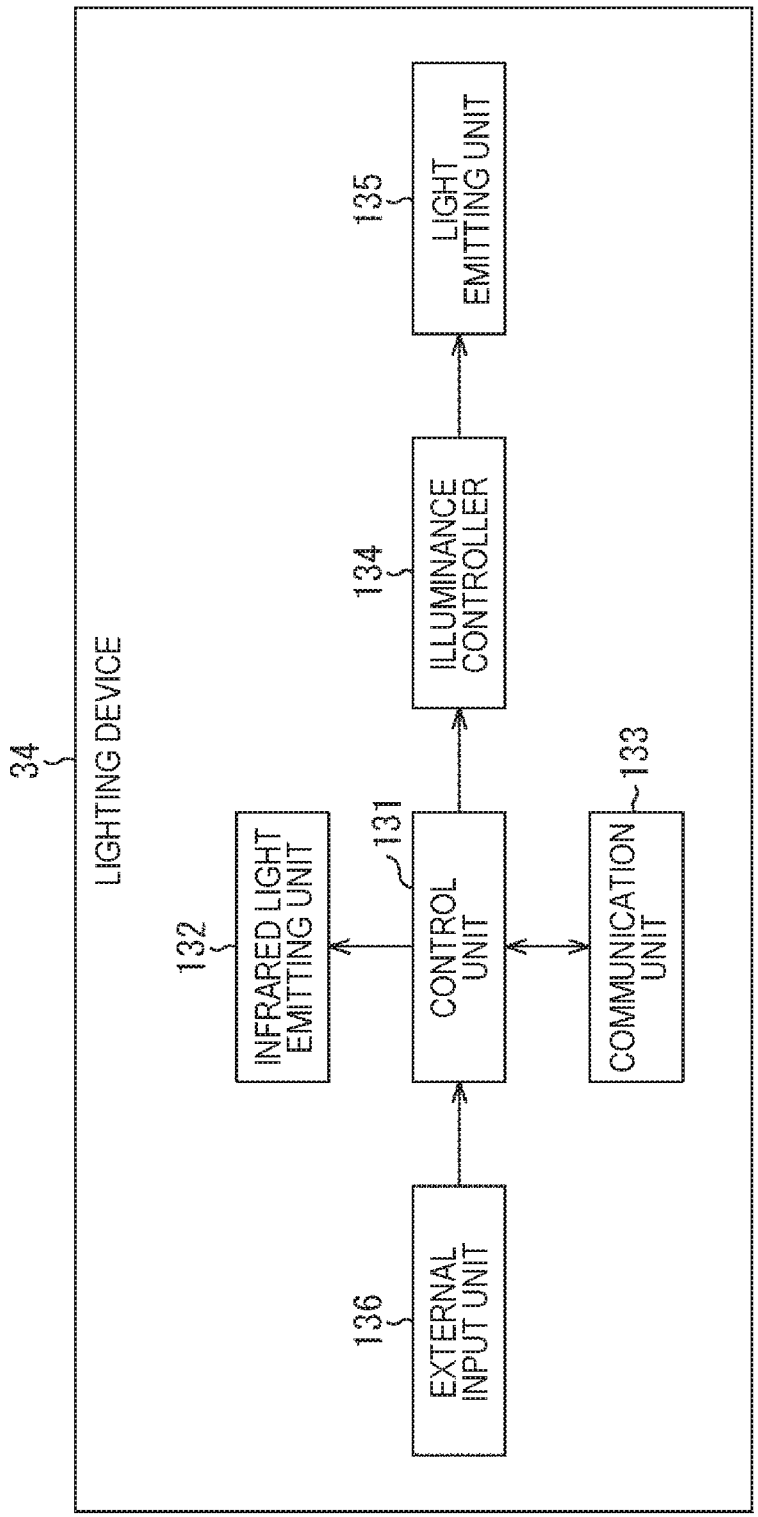
FIG. 7 is a diagram illustrating a configuration example for implementing a function of a lighting device.
Figure 17:
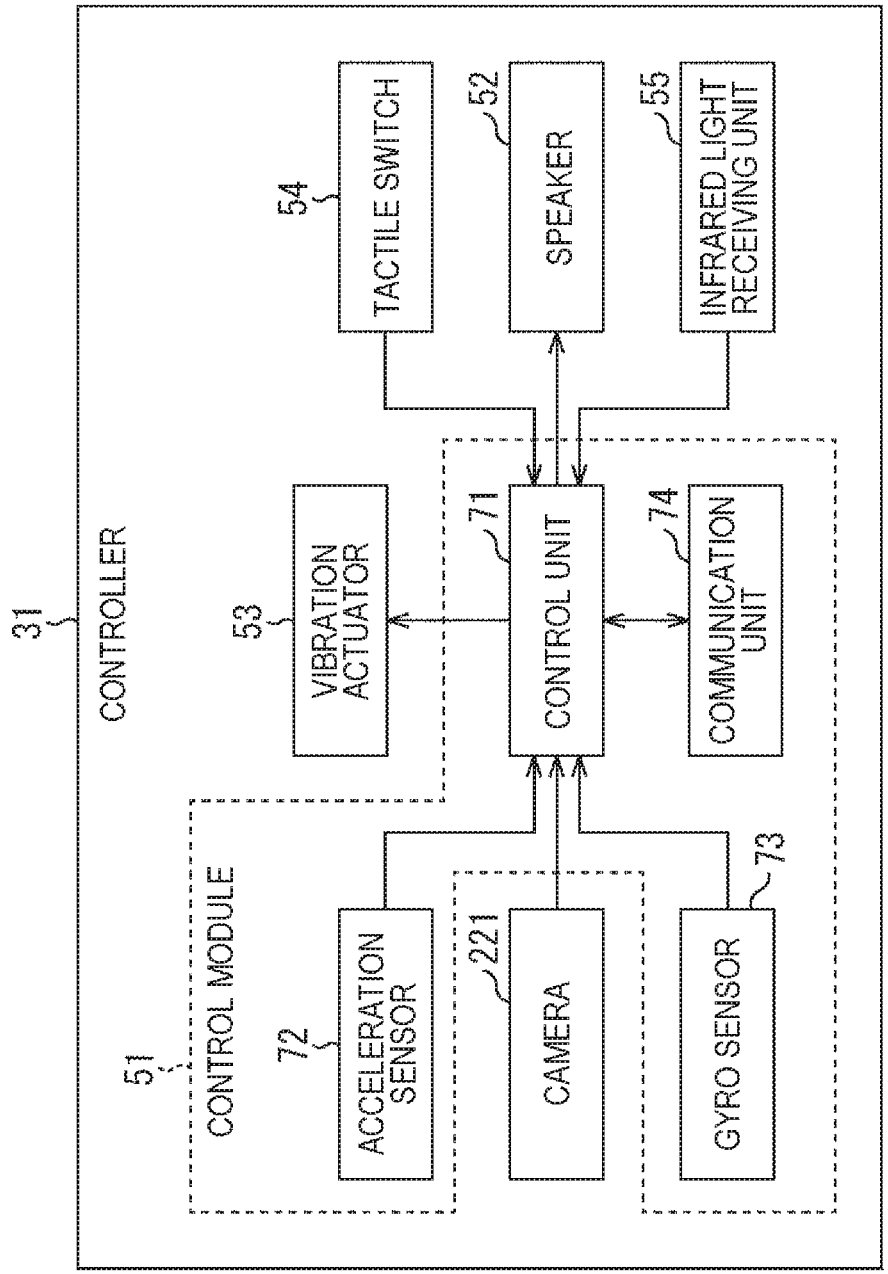
FIG. 17 is a diagram illustrating a configuration example for implementing a function of the controller in FIG. 15.
Figure 18:
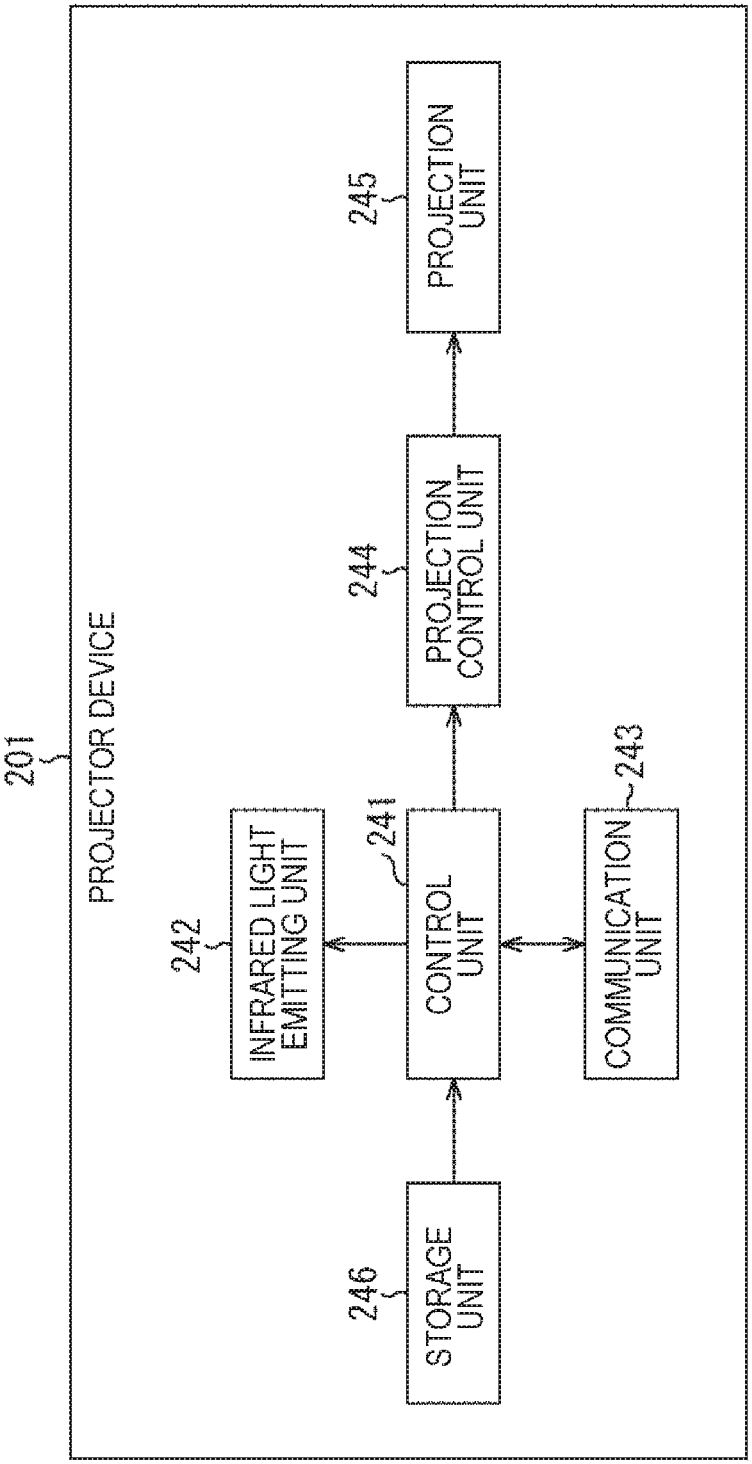
FIG. 18 is a diagram illustrating a configuration example for implementing a function of a projector device in FIG. 15.

Note that the control unit 71 of the controller 31 in FIGS. 3 and 17, the control unit 91 of the speaker device 32 in FIG. 5, the control unit 111 of the television receiver 33 in FIG. 6, the control unit 131 of the lighting device 34 in FIG. 7, and the control unit 241 of the projector device 201 in FIG. 18 correspond to the CPU 1001 of the personal computer in FIG. 24.

Furthermore, in the present specification, a system means a set of a plurality of components (devices, modules (parts), and the like), and it does not matter whether or not all components are in the same housing. Consequently, a plurality of devices housed in separate housings and connected via a network, and one device having a plurality of modules housed in one housing are both systems.

Note that embodiments of the present disclosure are not limited to the embodiments described above, and can be modified in various ways within a scope of the present disclosure.

For example, the present disclosure can have a cloud computing configuration in which a plurality of devices shares one function and collaborates in processing via a network.

Furthermore, each step described in the above-described flowcharts can be executed by one device or can be shared by a plurality of devices.

Moreover, in a case where a plurality of types of processing is included in one step, the plurality of types of processing included in that step can be executed by one device or can be shared by a plurality of devices.

Note that the present disclosure can also be configured as described below.

<1> A control device including:

an identification signal receiving unit that receives, from a control target device that transmits or receives a directional wireless signal, an identification signal for identifying the control target device; and a control unit that transmits a control command for controlling the control target device specified by the identification signal, to the control target device that has transmitted the identification signal, in which the identification signal receiving unit receives the identification signal for identifying the control target device when a direction of a main body of the control device has been adjusted to a state that allows for reception of the identification signal.

<2> The control device according to <1>, further including a direction detection unit that detects the direction of the main body of the control device, in which the control unit generates a control command for controlling the control target device specified by the identification signal on the basis of a change in the direction of the main body of the control device detected by the direction detection unit, and transmits the generated control command to the control target device that has transmitted the identification signal.

<3> The control device according to <2>, in which the control unit calculates a control parameter for controlling the control target device specified by the identification signal on the basis of a change in the direction of the main body detected by the direction detection unit, generates a control command in accordance with the control parameter, and transmits the control command to the control target device that has transmitted the identification signal.

<4> The control device according to <3>, in which the control unit calculates a control parameter for controlling the control target device specified by the identification signal on the basis of an amount of rotation when a twisting rotation around a predetermined axis is applied to the main body of the control device detected by the direction detection unit, generates a control command in accordance with the control parameter, and transmits the control command to the control target device that has transmitted the identification signal.

<5> The control device according to <4>, further including a vibration unit that vibrates the main body of the control device, in which the control unit causes the vibration unit to vibrate in accordance with the control parameter.

<6> The control device according to <5>, in which the control unit causes the vibration unit to vibrate at a predetermined time interval and at a predetermined intensity in accordance with the control parameter.

<7> The control device according to <6>, in which the control unit causes, in a case where the control parameter is a continuous variable, the vibration unit to vibrate at a time interval in accordance with the control parameter and at an intensity in accordance with the control parameter.

<8> The control device according to <6>, in which the control unit causes, in a case where the control parameter is a discrete variable, the vibration unit to vibrate at a time interval in accordance with the control parameter and at a constant intensity.

<9> The control device according to <5>, in which the control unit receives feedback information indicating a state of the control target device after the control target device that has transmitted the identification signal has executed the control command, and causes the vibration unit to vibrate on the basis of the feedback information.

<10> The control device according to <3>, further including an audio output unit that generates sound, in which the control unit causes the audio output unit to output sound in accordance with the control parameter.

<11> The control device according to any one of <1> to <9>, in which the control target device is a speaker device, and the control command is a command for controlling a volume of the speaker device.

<12> The control device according to any one of <1> to <9>, in which the control target device is a television receiver, and the control command is a command for controlling a channel of the television receiver.

<13> The control device according to any one of <1> to <9>, in which the control target device is a lighting device, and the control command is a command for controlling brightness of the lighting device.

<14> The control device according to any one of <1> to <9>, in which the control target device is a projector device, and the control command is a command for controlling movement of content projected on a wall surface by the projector device.

<15> The control device according to <14>, further including:

a vibration unit that vibrates the main body of the control device; and an imaging unit that images a wall surface on which the content is projected by the projector device, in which the control unit estimates a texture of the wall surface on the basis of an image captured by the imaging unit, and, when the content projected on the wall surface is moved, the control unit causes the vibration unit to vibrate in accordance with bumps and dips of the texture in a path through which the content is moved.

<16> The control device according to any one of <1> to <15>, in which the control target device emits the identification signal by infrared light having a predetermined light emission pattern, an electromagnetic wave output by a directional antenna, or an ultrasonic wave output by a directional speaker.

<17> A method of controlling a control device, the method including:

identification signal receiving processing of receiving, from a control target device that transmits or receives a directional wireless signal, an identification signal for identifying the control target device; and control processing of transmitting a control command for controlling the control target device specified by the identification signal, to the control target device that has transmitted the identification signal, in which the identification signal receiving processing receives the identification signal for identifying the control target device when a direction of a main body of the control device has been adjusted to a state that allows for reception of the identification signal.

<18> A program that causes a computer that controls a control device to function, the program causing the computer to function as:

an identification signal receiving unit that receives, from a control target device that transmits or receives a directional wireless signal, an identification signal for identifying the control target device; and a control unit that transmits a control command for controlling the control target device specified by the identification signal, to the control target device that has transmitted the identification signal, in which the identification signal receiving unit receives the identification signal for identifying the control target device when a direction of a main body of the control device has been adjusted to a state that allows for reception of the identification signal.

<19> An electronic device controlled by a control device, the electronic device including:

an identification signal generation unit that generates an identification signal for identifying itself as the electronic device by a directional wireless signal; and a control unit that controls operation, with the electronic device recognized as a control target device on the basis of the identification signal, by executing a control command for controlling the electronic device transmitted from the control device, in which the identification signal is received by the control device as the identification signal for identifying the electronic device when a direction of a main body of the control device is adjusted to a state that allows for reception of the identification signal.

REFERENCE SIGNS LIST

11 Control system
31 Controller
32 Speaker device
33 Television receiver
34 Lighting device
35 Wireless communication network
51 Control module
52 Speaker
53 Vibration actuator
54 and 54-1 to 54-3 Tactile switch
55 Infrared light receiving unit
71 Control unit
72 Acceleration sensor
73 Gyro sensor
74 Communication unit
91 Control unit
92 Infrared light receiving unit
93 Communication unit
94 Volume controller
95 Speaker
111 Control unit
112 Infrared light receiving unit
113 Communication unit
114 Channel controller
115 Tuner
116 Display unit
117 Speaker
118 Volume controller
131 Control unit
132 Infrared light receiving unit
133 Communication unit
134 Illuminance controller
135 Light emitting unit
201 Projector device
221 Camera
241 Control unit
242 Infrared light emitting unit
243 Communication unit
244 Projection control unit
245 Projection unit
301 Control unit
302 Infrared light receiving unit
303 Communication unit
304 Volume controller
305 Speaker
306 External input unit
331 Additional device
351 Control unit
352 Communication unit
353 Infrared light receiving unit
354 External output unit

The invention claimed is:

1. A control device, comprising:
an identification signal receiver configured to receive, from a control target device that one of transmits or receives a directional wireless signal, an identification signal for identification of the control target device; and
at least one processor configured to:
detect a direction of a main body of the control device, wherein the reception of the identification signal for the identification of the control target device is based on the direction of the main body of the control device adjusted to a state that allows for the reception of the identification signal;
detect an amount of rotation generated based on a twisting rotation of the main body around an axis of the main body;
calculate, based on the amount of rotation and a change in the detected direction of the main body, a control parameter to control the control target device specified by the identification signal;
generate a control command based on the control parameter; and
transmit the control command to the control target device that has transmitted the identification signal.

2. The control device according to claim 1, further comprising a vibration actuator configured to vibrate the main body of the control device,
wherein the at least one processor is further configured to control, based on the control parameter, the vibration actuator to vibrate.

3. The control device according to claim 2, wherein the at least one processor is further configured to control, based on the control parameter, the vibration actuator to vibrate at a first time interval and at a specific intensity.

4. The control device according to claim 3, wherein the control parameter is a continuous variable.

5. The control device according to claim 3, wherein
the at least one processor is further configured to control, in a case where the control parameter is a discrete variable, the vibration actuator to vibrate at a second time interval and at a constant intensity, and wherein the second time interval is based on the control parameter.

6. The control device according to claim 2, wherein the at least one processor is further configured to:

receive feedback information which indicates a state of the control target device, upon execution of the control command, and control, based on the feedback information, the vibration actuator to vibrate.

7. The control device according to claim 1, further comprising a speaker configured to output sound, wherein the at least one processor is further configured to control, based on the control parameter, the speaker to output the sound.

8. The control device according to claim 1, wherein the control target device is a speaker device, and the control command is a command to control a volume of the speaker device.

9. The control device according to claim 1, wherein the control target device is a television receiver, and the control command is a command to control a channel of the television receiver.

10. The control device according to claim 1, wherein the control target device is a lighting device, and the control command is a command to control a brightness of the lighting device.

11. The control device according to claim 1, wherein the control target device is a projector device, and the control command is a command to control a movement of content projected on a wall surface by the projector device.

12. The control device according to claim 11, further comprising:

a vibration actuator configured to vibrate the main body of the control device; and an imaging device configured to image the wall surface on which the content is projected by the projector device, wherein the at least one processor is further configured to:

determine a texture of the wall surface based on an image captured by the imaging device, and control, based on the movement of the content projected on the wall surface, the vibration actuator to vibrate based on bumps and dips of the texture in a path through which the content is moved.

13. The control device according to claim 1, wherein the control target device emits the identification signal by at least one of an infrared light having a specific light emission pattern, an electromagnetic wave output by a directional antenna, or an ultrasonic wave output by a directional speaker.

14. A method of controlling a control device, the method comprising:

receiving, from a control target device that one of transmits or receives a directional wireless signal, an identification signal for identification of the control target device;

detecting a direction of a main body of the control device, wherein the reception of the identification signal for the identification of the control target device is based on the direction of the main body of the control device adjusted to a state that allows for the reception of the identification signal;

detecting an amount of rotation generated based on a twisting rotation of the main body around an axis of the main body;

calculating, based on the amount of rotation and a change in the detected direction of the main body, a control parameter to control the control target device specified by the identification signal;

generating a control command based on the control parameter; and transmitting the control command to the control target device that has transmitted the identification signal.

15. A non-transitory computer-readable medium having stored thereon, computer executable-instructions that, when executed by a processor, cause the processor to execute operations, the operations comprising:

receiving, from a control target device that one of transmits or receives a directional wireless signal, an identification signal for identification of the control target device;

detecting a direction of a main body of a control device, wherein the reception of the identification signal for the identification of the control target device is based on the direction of the main body of the control device adjusted to a state that allows for the reception of the identification signal;

detecting an amount of rotation generated based on a twisting rotation of the main body around an axis of the main body;

calculating, based on the amount of rotation and a change in the detected direction of the main body, a control parameter to control the control target device specified by the identification signal;

generating a control command based on the control parameter; and transmitting the control command to the control target device that has transmitted the identification signal.

16. An electronic device controlled by a control device, the electronic device comprising:

at least one processor configured to:

generate an identification signal for identification of itself as the electronic device by a directional wireless signal;

execute, based on a recognition of the electronic device as a control target device, a control command transmitted from the control device to control the electronic device; and transmit, based on the execution of the control command, feedback information which indicates a state of the electronic device, wherein the identification signal is received by the control device as the identification signal for the identification of the electronic device when a direction of a main body of the control device is adjusted to a state that allows for the reception of the identification signal, and the control device:

detects an amount of rotation generated based on a twisting rotation of the main body around an axis of the main body, calculates, based on the amount of rotation and a change in the direction of the main body, a control parameter to control the electronic device specified by the identification signal, and generates the control command based on the control parameter.

17. A control device, comprising:
- an identification signal receiver configured to receive, from a projector device that one of transmits or receives a directional wireless signal, an identification signal for identification of the projector device;
- a vibration actuator configured to vibrate a main body of the control device;
- an imaging device configured to image a wall surface on which content is projected by the projector device; and
- at least one processor configured to:
  - detect a direction of the main body of the control device,
    - wherein the reception of the identification signal for the identification of the projector device is based on the direction of the main body of the control device adjusted to a state that allows for the reception of the identification signal;
  - transmit a control command to the projector device that has transmitted the identification signal, wherein the control command is a command to control a movement of the content projected on the wall surface by the projector device;
  - determine a texture of the wall surface based on an image captured by the imaging device; and
  - control, based on the movement of the content projected on the wall surface, the vibration actuator to vibrate based on bumps and dips of the texture in a path through which the content is moved.

* * * * *